US007389512B2

(12) United States Patent
Tucker

(10) Patent No.: US 7,389,512 B2
(45) Date of Patent: Jun. 17, 2008

(54) INTERPROCESS COMMUNICATION WITHIN OPERATING SYSTEM PARTITIONS

(75) Inventor: Andrew G. Tucker, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 730 days.

(21) Appl. No.: 10/766,094

(22) Filed: Jan. 27, 2004

(65) Prior Publication Data
US 2004/0226023 A1  Nov. 11, 2004

Related U.S. Application Data

(60) Provisional application No. 60/469,558, filed on May 9, 2003.

(51) Int. Cl.
*G06F 3/00* (2006.01)
*G06F 9/44* (2006.01)
*G06F 9/46* (2006.01)
*G06F 13/00* (2006.01)

(52) U.S. Cl. ..................................................... 719/313
(58) Field of Classification Search ......... 719/311–315
See application file for complete search history.

(56) References Cited

U.S. PATENT DOCUMENTS

| | | |
|---|---|---|
| 5,155,809 A | 10/1992 | Baker et al. |
| 5,283,868 A | 2/1994 | Baker et al. |
| 5,291,597 A | 3/1994 | Shorter et al. |
| 5,325,517 A | 6/1994 | Baker et al. |
| 5,325,526 A | 6/1994 | Cameron et al. |
| 5,437,032 A | 7/1995 | Wolf et al. |
| 5,590,314 A * | 12/1996 | Ueno et al. ................ 719/321 |

(Continued)

FOREIGN PATENT DOCUMENTS

EP    389151 A2    9/1990

(Continued)

OTHER PUBLICATIONS

Presotto et al., Interprocess Communication in the Ninth Edition Unix System, John Wiley & Sons, Ltd, Mar. 1990, pp. 1-14.*

(Continued)

*Primary Examiner*—William Thomson
*Assistant Examiner*—Diem K Cao
(74) *Attorney, Agent, or Firm*—Hickman Palermo Truong & Becker LLP

(57) ABSTRACT

In some embodiments, techniques for controlling interprocess communications in a single kernel instance operating system partitioned into a global zone and one or more non-global zones. In one embodiment, a method is provided. The method can include establishing a non-global zone for isolating processes from processes in other non-global zones in a global operating system environment controlled by a single kernel instance. The method can include, responsive to a first request, creating a communications object having a unique identifier corresponding to the non-global zone of a process making the first request. The method may include, responsive to a second request, initiating a communications using the communications object for a process making the second request, if the process making the second request is determined to be associated with the non-global zone having a unique identifier matching the unique identifier of the communications object.

9 Claims, 12 Drawing Sheets

U.S. PATENT DOCUMENTS

| | | | |
|---|---|---|---|
| 5,784,706 | A | 7/1998 | Oberlin et al. |
| 5,841,869 | A * | 11/1998 | Merkling et al. ............ 713/164 |
| 5,845,116 | A | 12/1998 | Saito et al. |
| 5,963,911 | A | 10/1999 | Walker et al. |
| 6,064,811 | A | 5/2000 | Spilo et al. |
| 6,074,427 | A | 6/2000 | Fought et al. |
| 6,075,938 | A | 6/2000 | Bugnion et al. |
| 6,279,046 | B1 | 8/2001 | Armstrong et al. |
| 6,289,462 | B1 * | 9/2001 | McNabb et al. ............... 726/21 |
| 6,438,594 | B1 | 8/2002 | Bowman-Amuah |
| 6,557,168 | B1 | 4/2003 | Czajkowski |
| 6,633,963 | B1 | 10/2003 | Ellison et al. |
| 6,681,238 | B1 * | 1/2004 | Brice et al. ..................... 718/1 |
| 6,681,258 | B1 | 1/2004 | Ratcliff et al. |
| 6,701,460 | B1 | 3/2004 | Suwandi et al. |
| 6,725,457 | B1 | 4/2004 | Priem et al. |
| 6,738,832 | B2 | 5/2004 | Burr et al. |
| 6,792,514 | B2 | 9/2004 | Kapoor et al. |
| 6,813,766 | B2 | 11/2004 | Hay |
| 6,859,926 | B1 | 2/2005 | Brenner et al. |
| 6,944,699 | B1 * | 9/2005 | Bugnion et al. ............ 710/269 |
| 6,957,435 | B2 | 10/2005 | Armstrong et al. |
| 6,961,941 | B1 | 11/2005 | Nelson et al. |
| 6,993,762 | B1 | 1/2006 | Pierre |
| 7,051,340 | B2 | 5/2006 | Fisher et al. |
| 7,076,634 | B2 | 7/2006 | Lambeth et al. |
| 7,095,738 | B1 | 8/2006 | Desanti |
| 7,096,469 | B1 | 8/2006 | Kubala et al. |
| 7,188,120 | B1 | 3/2007 | Leonard et al. |
| 2002/0069369 | A1 | 6/2002 | Tremain |
| 2002/0083367 | A1 | 6/2002 | McBride et al. |
| 2002/0120660 | A1 | 8/2002 | Hay et al. |
| 2002/0124072 | A1 | 9/2002 | Tormasov et al. |
| 2002/0156824 | A1 | 10/2002 | Armstrong et al. |
| 2002/0161817 | A1 | 10/2002 | Dorofeev et al. |
| 2002/0173984 | A1 | 11/2002 | Robertson et al. |
| 2002/0174215 | A1 | 11/2002 | Schaefer |
| 2003/0014466 | A1 * | 1/2003 | Berger et al. ............... 709/102 |
| 2003/0069939 | A1 | 4/2003 | Russell |
| 2004/0010624 | A1 | 1/2004 | Garofalo et al. |
| 2004/0162914 | A1 | 8/2004 | St. Pierre et al. |
| 2004/0210760 | A1 | 10/2004 | McGrath et al. |
| 2004/0215848 | A1 * | 10/2004 | Craddock et al. ............. 710/39 |

FOREIGN PATENT DOCUMENTS

| | | |
|---|---|---|
| EP | 1 253 516 A2 | 10/2002 |
| EP | 1300766 A | 4/2003 |
| GB | 2301912 A | 12/1996 |
| WO | WO 00/45262 A2 | 8/2000 |
| WO | WO 02/061554 A1 | 8/2002 |

OTHER PUBLICATIONS

Stevens, Advanced programming in the Unix Environment, Addison-Wesley, 1993, pp. 427-436.*

Watson, TrustedBSD—Adding Trusted Operating System Features to FreeBSD, The USENIX Association, 2001, pp. 1-14.*

Noordende et al., Secure and Portable Confinement of Untrusted Programs, ACM, 2002, pp. 1-14.*

Hope, Using Jails in FreeBSD for fun and profit, ;login: The Magazine of USENIX & SAGE, Jun. 2002, vol. 27—No. 3, pp. 48-55.*

Communications from the ACM (ISSN: 0001-0782) vol. 44, Issue 2 (2001) entitled "An Operating System Approach to Securing E-Services" by Chris Dalton and Tse Huong Choo, ACM Copyright Notice, © 2001, (8 pgs).

Sun Microsystems, Inc. entitled Server Virtualization with Trusted Solaris™ 8 Operating Environment, by Glenn Faden, Sun BluePrints™ OnLine—Feb. 2002, http://www.sun.com/blueprints, (21 pgs).

Network Working Group entitled "IP Version 6 Addressing Architecture", by R. hinden, Nokia, S. Deering, Cisco System, dtd Jul. 1998, (28 pgs).

IBM entitled Partitioning for the IBM eserver pSeries 690 System, © Copyright IBM Corp. 2001 (12 pgs).

IBM System Partitioning on IBM eserver xSeries Servers entitled "Effective Server Consolidation and Resource Management with System Partitioning" by Mark T. Chapman, IBM Server Group, dtd Dec. 2001, (23 pgs).

Virtual Private Servers and Security Contexts, dtd May 10, 2004, http://www.solucorp.qc.ca/miscprj/s_content.hc?prjstate=1 &nodoc=0, (2 pgs).

SunSoft, a Sun Microsystems, Inc. Business entitled "File System Administration", © 1994 Sun Microsystems, Inc., (62 pgs).

Poul-Henning Kamp, et al., "Jails: Confining the omnipotent root", 2nd Intl System Administration and Networking Conference Proceedings "SANE 2000", May 22-25, 2000, Maastricht, The Netherlands.

European Search Report from the European Patent Office for Foreign Patent Application No. 04252690.5 (3 pgs.).

Claims As Filed in European Patent Application No. 04252690.5 (6 pgs.).

Official Action from EPO for foreign patent application No. 04 252 690.5-2211 dated Jun. 10, 2005 (6 pgs)-attached.

Current Claims in EPO patent application No. 04 252 690.5-2211 (9 pgs)-attached.

European Patent Office, "European Search Report," application No. 04252689.7, mailing date Jul. 28, 2005, 3 pages.

Current Claims, European patent application 04252689.7, 6 pages.

Sun Microsystems, "Sun Enterprise™ 1000 Server: Dynamic System Domains," White Paper Online, Feb. 26, 2003, retrieved from the internet at <http://www.sun.com/servers/highend/whitepapers/domains.html?facet=-1>, retrieved on Jun. 21, 2005, XP-002332946, 7 pages.

"CHMOD—Change the Permission Mode of a File," Internet Citation, Dec. 4, 2000, XP007901399, Retrieved from the internet at http://www.cse.msu.edu/cgi-bin/man2html?chmod?1?/usr/man, retrieved in Dec. 4, 2006, 7 pages.

"SETFACL—Modify the Access Control List (ACL) for a File or Files," Internet Citation, Dec. 11, 2001, XP007901398, Retrieved from the Internet at http://www.cse.msu.edu/cgi-bin/man2html?setfacl?1?/usr/man, retrieved on Dec. 4, 2006, 4 pages.

Vance, Ashlee, "Solaris 10 to get Zoned," The Register, Apr. 9, 2003, XP007901426, located on the internet at http://www.theregister.co.uk/2003/04/09/solaris, retrieved on Dec. 7, 2006, 2 pages.

Hall, Brian Beej, "FIFOs," Copyright 1997 by Brian "Beej" Hall, XP007901420, located on the internet at http://www.ecst.csuchico.edu/{beej/guide/ipc/fifos.html, retrieved on Dec. 7, 2006, 6 pages.

IBM, "Privilege Control Mechanism, for INIX Systems," IBM Technical Disclosure Bulletin, vol. 34, No. 7B, Dec. 1991, XP000282651, pp. 477-479.

Hall, Brian "Beej", "Beej's Guide to Network Programming—Using Network Sockets," Copyright 1995-2001 by Brian " Beej" Hall, XP007901423, pp. 1-49.

Hall, Brian Beej, "Memory Mapped Files," Copyright 1997 by Brian "Beej" Hall, XP007901425, located on the internet at http://www.ecst.csuchico.edu/{beej/guide/ipc/mmap.html, retrieved on Dec. 7, 2006, 4 pages.

Hall, Brian Beej, "Shared Memory Segments,"Copyright 1997 by Brian "Beej" Hall, XP007901424, located on the internet at http://www.ecst.csuchico.edu/{beej/guide/ipc/shmem.html, retrieved on Dec. 7, 2006, 5 pages.

European Patent Office, "European Search Report," App. No. 04252661.6 dated Dec. 21, 2006, 4 pages.

Current Claims for App. No. 04252661.6, 8 pages.

Hewlett-Packard, "Installing and Managing HP-UX Virtual Partitions (vPars)", Third Edition, Part No. T1335-90018, Copyright Hewlett-Packard Company, Nov. 2002, pp. 1-4, 17-44, 72-75, and 157-161.

Hope, Paco, "Using Jails in FreeBSD for Fun and Profit", ;Login: The Magazine of Usenix and Sage, vol. 27, No. 3, Jun. 2002, 9 pages.

Kamp, Poul-Henning, "Rethinking / dev and devices in the UNIX kernel", BSDCon 2002 Paper, retrieved from website <http://www.usenix.org/events/bsdcon02/full_papers/kamp/kamp_html/index.html> Printed May 1, 2007, 18 pages.

Thompson, K., "UNIX Implementation", Bell Laboratories, The Bell System Technical Journal, 1978, pp. 1-9.

Czajkowski, G., "Application isolation in the Java Virtual Machine", 2000, ACM Press, Proceedings of the 15th ACM SIGPLAN Conference on Object-Oriented Programming, Systems, Languages, and Applications, pp. 354-366.

Czajkowski, G., "Multitasking without compromise: a virtual machine evolution", ACM Press, Proceedings of the 16th ACM SIGPLAN Conference on Object Oriented Programming, Systems, Languages, and Applications, dated Oct. 2001, pp. 125-138.

Osman, S., et al., "The design and implementation of Zap: a system for migrating computing environments", SIGOPS Operating System, Rev. 36, SI, dated Dec. 2000, pp. 361-376.

Office Action from CN for foreign patent application No. 200410059540.3 dated May 25, 2007.

Current claims in CN patent application No. 200410059540.3 (13 pgs).

Mc Dougall, Richard, et al., "Resource Management", Prentice Hall, 1999, 25 pages.

* cited by examiner

INTERPROCESS COMMUNICATION WITHIN OPERATING SYSTEM PARTITIONS

CLAIM OF PRIORITY

This application claims benefit of Provisional Application No. 60/469,558, filed May 9, 2003, entitled "OPERATING SYSTEM VIRTUALIZATION," by Andrew G. Tucker, et al., the entire contents of which are incorporated by reference as if fully set forth herein.

BACKGROUND

Many of today's computing systems include computing resources that are not fully utilized. Such underutilization provides a potential opportunity to the owners of these systems to obtain greater capacity or cost reduction through improving utilization of these computing resources.

A number of approaches could be used to address the problem of improving utilization, including consolidation of multiple applications onto a single hardware platform. Consolidation approaches typically attempt to support the co-existence of multiple applications on a single unit of hardware in order to achieve greater function from fewer hardware platforms. A variety of computing resource management techniques could be used for this purpose.

Such computing resource management extensions, however, must address security and management issues arising from the concurrent execution of multiple applications on a single platform. For example, if web server applications belonging to two or more "untrusting" parties, i.e., market competitors, for example, are co-located on a single hardware platform, neither party will be content with the other party's having access to that party's private information. Some computer system functions, including for example, facilities to allocate and use hardware resources, i.e., network connections, DASD, output devices, and so forth, file system resources and communications resources could be used by one untrusting party to access the information or applications of another party if access is not controlled. Accordingly, in environments where users do not trust each other to perform system resource related tasks, the system administrator may be burdened with responsibility of performing each action involving critical system resources at significant time and expense.

One approach to the utilization and security issues arising in consolidation techniques is to partition machine resources among a number of logical partitions (LPARs) or virtual partitions (VPARs), effectively creating multiple machine images on a single platform. Such logical partitioning approaches potentially provide complete isolation among applications based in different machine images. A number of issues arise, however, with logical partitioning approaches. Such approaches may require implementation of hardware support (such as the introduction of an additional privilege level) to isolate privileged programs such as operating system kernels. Also, logical partitioning may require that the system administrator manage the configuration for the logical partitions and the allocation of resources among the logical partitions.

In another possible approach, one or more instances of operating system images that execute concurrently on a single hardware platform provide a plurality of "Virtual Machines." In such approaches, each virtual machine may be a separate operating system instance that provides isolation for programs running in the virtual machine from other programs running in a second virtual machine. While such virtual machine approaches provide isolation between applications, other issues with such approaches may arise. For example, it may not be necessary, or even desirable to have multiple instances of an entire operating system for some applications. The complexity of administration and management for different operating systems images may weigh in favor of more simplified approaches.

Another approach would be to implement compartmentalization into a number of operating system functions. For example, some operating systems employing hierarchical file systems include a function to provide a level of compartmentalization by limiting file system access to a particular process. Such mechanisms, however, also suffer drawbacks. For example, a process's visibility of the file system name space may be limited to a single subtree of the file system in many implementations. Thus, compartmentalization typically does not extend to the process or networking spaces, making observation and interference by other processes possible.

A yet further approach would be to confine a process and its progeny (i.e., parent and children) to compartmentalized allocations of system resources, i.e., file system, network facilities, and so forth. In this approach, a process placed in such a compartment, termed a "Jail," would have access to allocated system resources, but no visibility nor access to files, processes or network services outside of the Jail. A number of issues arise with the Jails approach, as well. Typically, Jails have no independent existence apart from the process for which the Jail is created. In other words, once the process creating the Jail (and its progeny, if any) terminates, the Jail terminates. Also, a second process cannot "join" a Jail.

SUMMARY

In some embodiments, the present invention provides techniques for managing inter-process communications in an operating system environment partitioned into a global zone and one or more non-global zones. The non-global zones isolate processes from processes associated with other non-global zones under the control of a single operating system kernel instance. In one embodiment, a key-based namespace may be used to isolate inter-process communications objects of the non-global zones. In another embodiment, one or more file system locations that serve as rendezvous points for processes seeking to exchange information may be used to isolate inter-process communications of the non-global zones. In further embodiments, combinations of key-based name space techniques and file system location techniques may be used. In yet further embodiments, other types of mechanisms may be used to provide isolation.

In one embodiment employing a key-based name space technique, a state of each communications object is maintained in a separate data structure for each non-global zone. In one embodiment, the state of each communications object may be maintained in a kernel resident data structure allocated for each non-global zone. Processes and communications objects may have a key associated therewith, which indicates the non-global zone in which the process or communications object resides. In one embodiment, the key of a process is a unique identifier of the non-global zone in which the process resides. In one embodiment, the key of a communications object is the key of the process that creates the communications object. Processes seeking to establish an inter-process communications session with another process may present a key to a kernel resident process servicing the request to establish the inter-process communications path. The kernel resident process verifies that the requesting process' key matches the key of the communications object for the requested inter-process communications path using the kernel resident data structure.

In one embodiment employing a file system based technique, a state of each communications object is maintained in a separate file system location for each non-global zone. In one embodiment, processes seeking to establish an inter-process communications path use specific file system locations as "rendezvous" points. Processes authorized to use inter-process communications may be provided with access permissions to communications objects stored within the specific file system locations of the non-global zone in which the processes reside. Because processes within a non-global zone are only permitted to access portions of the file system allocated to the non-global zone, using specific file system locations as rendezvous points for inter-process communications enables some embodiments to isolate inter-process communications within non-global zone boundaries.

In some embodiments, inter-zone inter-process communications may be provided. In one embodiment, an interface is provided to enable kernel resident processes to retrieve credentials of a process ("requesting process") seeking to initiate an inter-process communications with another process ("recipient process") in a different non-global zone. The kernel resident process uses the credentials to verify that the requesting process is authorized to communicate with another process across a non-global zone boundary. If the requesting process is authorized, a communications path may be established between the requesting process and the recipient process. In one embodiment, the communications path is established using a process resident in the global operating system environment.

A communications object comprises an object that is associated with a transport medium used to provide inter-process communications. In some embodiments, communications objects comprise one or more of a loopback transport provider, a semaphore, a shared memory segment, a message queue, an event channel, a pipe, a stream, a socket, a POSIX Inter-Process Communications interface and a doors interface. In one embodiment, communications objects have an associated communications object identifier, which comprises one or more of an address, a socket identifier, a port, a flex address, a semaphore identifier, a message queue identifier, shared memory segment identifier, a pipe identifier and a stream identifier. Embodiments of the present invention are not limited to these types of communications transport media. Rather, many other types of communications transport media, both existing and prospective, may be used in other embodiments of the present invention, as will be readily apparent to one skilled in the art.

Using these and other techniques, some embodiments can provide isolation of inter-process communications within the non-global zones. Some embodiments can provide the capability for communications objects in one or more non-global zones to have identical identifiers without interference. Select embodiments can provide inter-zone inter-process communications.

DETAILED DESCRIPTION OF EMBODIMENT(S)

System Overview

Figure 1:
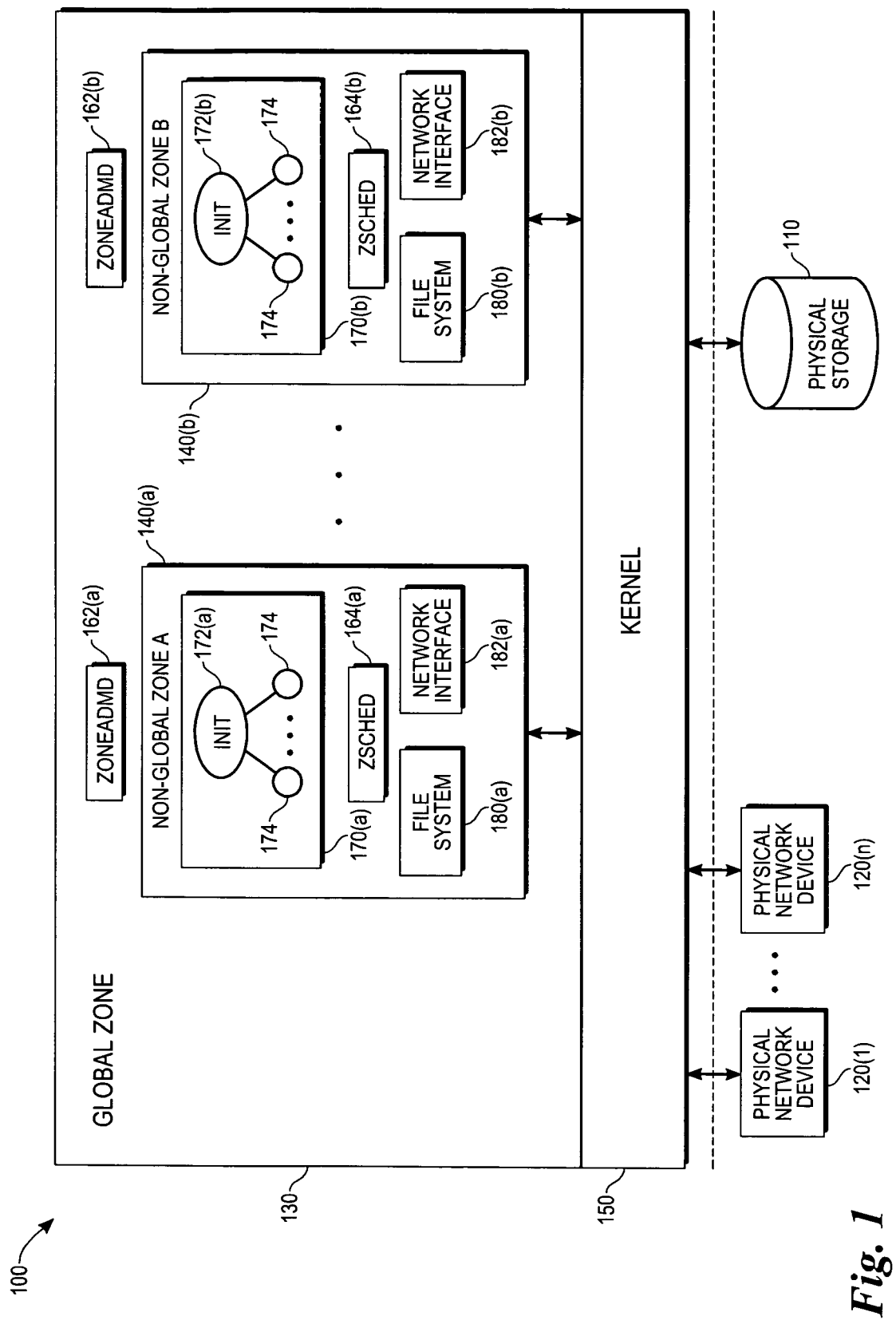
FIG. 1 is a functional block diagram of a representative operating system environment in which one embodiment of the present invention may be implemented.

In some embodiments, the present invention provides techniques for controlling inter-process communications in a single kernel instance operating system partitioned into a global zone and one or more non-global zones. In one embodiment, a method is provided. The method can include establishing a non-global zone for isolating processes from processes in other non-global zones in a global operating system environment controlled by a single kernel instance. The method can include, responsive to a first request, creating a communications object having a unique identifier corresponding to the non-global zone of a process making the first request. The method may include, responsive to a second request, initiating a communications using the communications object for a process making the second request, if the process making the second request is determined to be associated with the non-global zone having a unique identifier matching the unique identifier of the communications object.

In another aspect, the present invention provides in one embodiment, a method operative in a global operating system environment controlled by a single operating system kernel instance. The method can include establishing a non-global zone for isolating processes from processes in other non-global zones. Each non-global zone can have a unique zone identifier. Receiving from a first process executing in association with the non-global zone a first request to create a communications object is included in the method in some embodiments. The method may include, in response to receiving the first request, creating a communications object. The communications object can have the unique zone identifier of the first process associated therewith. Receiving from a second process a second request to initiate communications using the communications object is also part of the method. The method also may include, in response to receiving the second request, determining if the second process is associated with the non-global zone having the unique zone identifier of the communications object and denying the second request if the second process is not associated with the non-global zone having the unique zone identifier of the communications object.

In another aspect, the present invention provides in one embodiment, a method. The method can include establishing a non-global zone for isolating processes from processes in other non-global zones in a global operating system environment controlled by a single operating system kernel instance. Mounting a file system to a global file system of the global operating system environment at a point accessible by processes in one non-global zone can be included by the method. The method can include establishing a file system location in the file system of the non-global zone. Establishing a communications object within the file system location can be part of the method, also. The method may further include establishing access permissions for the file system locations. Receiving from a first process a request to initiate communications using the communications object may be part of the method. Also, the method may include, in response to receiving the request, determining if the first process is authorized to access the file system location of the communications object and denying the request if the first process is not authorized to access the file system location of the communications object.

In another aspect, the present invention provides in one embodiment, an inter-zone inter-process communications method. The method can include receiving a request from a requestor process in a first non-global zone to communicate with a recipient process in a second non-global zone. Retrieving credentials for the requestor process may be included in the method. In one embodiment, the credentials comprise a zone identifier indicating a non-global zone to which the requester process is bound. The method can include verifying that the requestor process is authorized to communicate with the recipient process across a zone boundary based upon the credentials. Further, the method can include establishing a communication path between the requestor process and the recipient process via the global operating system environment if the requestor process is authorized.

In other aspects, the invention encompasses in some embodiments, computer apparatuses, computing systems and computer-readable media configured to carry out the foregoing methods.

Some embodiments can isolate inter-process communications functions within non-global zone boundaries in an operating system environment that has been partitioned into one or more non-global zones controlled by a single kernel instance. Some embodiments enable processes in non-global zones to communicate with one another while enforcing zone boundaries upon these processes. Some embodiments can provide APIs or other interfaces to enable processes in different non-global zones to establish inter-process communications with one another.

Overview

FIG. 1 illustrates a functional block diagram of an operating system (OS) environment 100 in accordance with one embodiment of the present invention. OS environment 100 may be derived by executing an OS in a general-purpose computer system, such as computer system 400 illustrated in FIG. 4, for example. For illustrative purposes, it will be assumed that the OS is Solaris manufactured by Sun Microsystems, Inc. of Santa Clara, Calif. However, it should be noted that the concepts taught herein may be applied to any OS, including but not limited to Unix, Linux, Windows™, MacOS™, etc.

As shown in FIG. 1, OS environment 100 may comprise one or more zones (also referred to herein as partitions), including a global zone 130 and zero or more non-global zones 140. The global zone 130 is the general OS environment that is created when the OS is booted and executed, and serves as the default zone in which processes may be executed if no non-global zones 140 are created. In the global zone 130, administrators and/or processes having the proper rights and privileges can perform generally any task and access any device/resource that is available on the computer system on which the OS is run. Thus, in the global zone 130, an administrator can administer the entire computer system. In one embodiment, it is in the global zone 130 that an administrator executes processes to configure and to manage the non-global zones 140.

The non-global zones 140 represent separate and distinct partitions of the OS environment 100. One of the purposes of the non-global zones 140 is to provide isolation. In one embodiment, a non-global zone 140 can be used to isolate a number of entities, including but not limited to processes 170, one or more file systems 180, and one or more logical network interfaces 182. Because of this isolation, processes 170 executing in one non-global zone 140 cannot access or affect processes in any other zone. Similarly, processes 170 in a non-global zone 140 cannot access or affect the file system 180 of another zone, nor can they access or affect the network interface 182 of another zone. As a result, the processes 170 in a non-global zone 140 are limited to accessing and affecting the processes and entities in that zone. Isolated in this manner, each non-global zone 140 behaves like a virtual standalone computer. While processes 170 in different non-global zones 140 cannot access or affect each other, it should be noted that they may be able to communicate with each other via a network connection through their respective logical network interfaces 182. This is similar to how processes on separate standalone computers communicate with each other.

Having non-global zones 140 that are isolated from each other may be desirable in many applications. For example, if a single computer system running a single instance of an OS is to be used to host applications for different competitors (e.g. competing websites), it would be desirable to isolate the data and processes of one competitor from the data and processes of another competitor. That way, it can be ensured that information will not be leaked between the competitors. Partitioning an OS environment 100 into non-global zones 140 and hosting the applications of the competitors in separate non-global zones 140 is one possible way of achieving this isolation.

In one embodiment, each non-global zone 140 may be administered separately. More specifically, it is possible to assign a zone administrator to a particular non-global zone 140 and grant that zone administrator rights and privileges to manage various aspects of that non-global zone 140. With such rights and privileges, the zone administrator can perform any number of administrative tasks that affect the processes and other entities within that non-global zone 140. However, the zone administrator cannot change or affect anything in any other non-global zone 140 or the global zone 130. Thus, in the above example, each competitor can administer his/her zone, and hence, his/her own set of applications, but cannot change or affect the applications of a competitor. In one embodiment, to prevent a non-global zone 140 from affecting other zones, the entities in a non-global zone 140 are generally not allowed to access or control any of the physical devices of the computer system.

In contrast to a non-global zone administrator, a global zone administrator with proper rights and privileges may administer all aspects of the OS environment 100 and the computer system as a whole. Thus, a global zone administrator may, for example, access and control physical devices, allocate and control system resources, establish operational parameters, etc. A global zone administrator may also access and control processes and entities within a non-global zone 140.

In one embodiment, enforcement of the zone boundaries is carried out by the kernel 150. More specifically, it is the kernel 150 that ensures that processes 170 in one non-global zone 140 are not able to access or affect processes 170, file systems 180, and network interfaces 182 of another zone (non-global or global). In addition to enforcing the zone boundaries, kernel 150 also provides a number of other services. These services include but are certainly not limited to mapping the network interfaces 182 of the non-global zones 140 to the physical network devices 120 of the computer system, and mapping the file systems 180 of the non-global zones 140 to an overall file system and a physical storage 110 of the computer system. The operation of the kernel 150 will be discussed in greater detail in a later section.

Non-Global Zone States

In one embodiment, a non-global zone 140 may take on one of four states: (1) Configured; (2) Installed; (3) Ready; and (4) Running. When a non-global zone 140 is in the Configured state, it means that an administrator in the global zone 130 has invoked an operating system utility (in one embodiment, zonecfg(1 m)) to specify all of the configuration parameters of a non-global zone 140, and has saved that configuration in persistent physical storage 110. In configuring a non-global zone 140, an administrator may specify a number of different parameters. These parameters may include, but are not limited to, a zone name, a zone path to the root directory of the zone's file system 180, specification of one or more file systems to be mounted when the zone is created, specification of zero or more network interfaces, specification of devices to be configured when the zone is created, and zero or more resource pool associations.

Once a zone is in the Configured state, a global administrator may invoke another operating system utility (in one embodiment, zoneadm(1 m)) to put the zone into the Installed state. When invoked, the operating system utility interacts with the kernel 150 to install all of the necessary files and directories into the zone's root directory, or a subdirectory thereof.

To put an Installed zone into the Ready state, a global administrator invokes an operating system utility (in one embodiment, zoneadm(1 m) again), which causes a zoneadmd process 162 to be started (there is a zoneadmd process associated with each non-global zone). In one embodiment, zoneadmd 162 runs within the global zone 130 and is responsible for managing its associated non-global zone 140. After zoneadmd 162 is started, it interacts with the kernel 150 to establish the non-global zone 140. In creating a non-global zone 140, a number of operations are performed, including but not limited to assigning a zone ID, starting a zsched process 164 (zsched is a kernel process; however, it runs within the non-global zone 140, and is used to track kernel resources associated with the non-global zone 140), mounting file systems 180, plumbing network interfaces 182, configuring devices, and setting resource controls. These and other operations put the non-global zone 140 into the Ready state to prepare it for normal operation.

Putting a non-global zone 140 into the Ready state gives rise to a virtual platform on which one or more processes may be executed. This virtual platform provides the infrastructure necessary for enabling one or more processes to be executed within the non-global zone 140 in isolation from processes in other non-global zones 140. The virtual platform also makes it possible to isolate other entities such as file system 180 and network interfaces 182 within the non-global zone 140, so that the zone behaves like a virtual standalone computer. Notice that when a non-global zone 140 is in the Ready state, no user or non-kernel processes are executing inside the zone (recall that zsched is a kernel process, not a user process). Thus, the virtual platform provided by the non-global zone 140 is independent of any processes executing within the zone. Put another way, the zone and hence, the virtual platform, exists even if no user or non-kernel processes are executing within the zone. This means that a non-global zone 140 can remain in existence from the time it is created until either the zone or the OS is terminated. The life of a non-global zone 140 need not be limited to the duration of any user or non-kernel process executing within the zone.

After a non-global zone 140 is in the Ready state, it can be transitioned into the Running state by executing one or more user processes in the zone. In one embodiment, this is done by having zoneadmd 162 start an init process 172 in its associated zone. Once started, the init process 172 looks in the file system 180 of the non-global zone 140 to determine what applications to run. The init process 172 then executes those applications to give rise to one or more other processes 174. In this manner, an application environment is initiated on the virtual platform of the non-global zone 140. In this application environment, all processes 170 are confined to the non-global zone 140; thus, they cannot access or affect processes, file systems, or network interfaces in other zones. The application environment exists so long as one or more user processes are executing within the non-global zone 140.

After a non-global zone 140 is in the Running state, its associated zoneadmd 162 can be used to manage it. Zoneadmd 162 can be used to initiate and control a number of zone administrative tasks. These tasks may include, for example, halting and rebooting the non-global zone 140. When a non-global zone 140 is halted, it is brought from the Running state down to the Installed state. In effect, both the application environment and the virtual platform are terminated. When a non-global zone 140 is rebooted, it is brought from the Running state down to the Installed state, and then transitioned from the Installed state through the Ready state to the Running state. In effect, both the application environment and the virtual platform are terminated and restarted. These and many other tasks may be initiated and controlled by zoneadmd 162 to manage a non-global zone 140 on an ongoing basis during regular operation.

Inter-Process Communication

In some embodiments, local inter-process communication (IPC) functions may be implemented in an operating system environment using zones. In one embodiment, processes resident in the same non-global zone are able to communicate with one another. Processes in different non-global zones, however, normally are able to communicate via network APIs, as would be the case with processes running on separate machines. A process in the global zone may be permitted to construct a mechanism for processes in the non-global zones to communicate in one embodiment. Without the participation of the process in the global zone, however, communication by processes in non-global zones may be isolated to within their respective non-global zone in one embodiment.

Figure 2A:
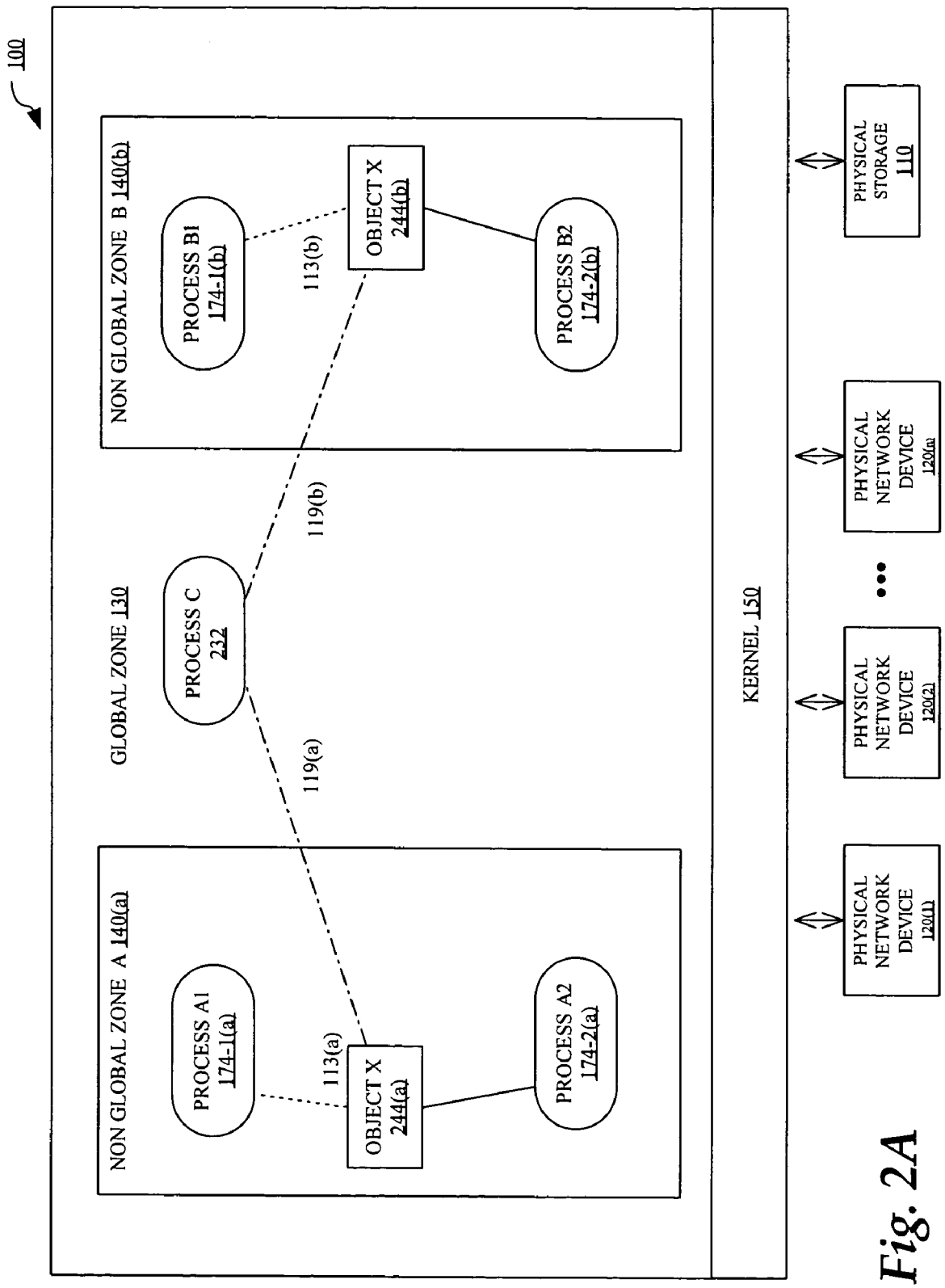
FIG. 2A is functional block diagram of a representative example of communications object management in an operating system environment of FIG. 1 in an embodiment of the present invention.

FIG. 2A is functional block diagram of a representative example of communications object management in an operating system environment of FIG. 1 in an embodiment of the present invention. As shown in FIG. 2A, during runtime, operating system environment 100 provides a plurality of persistent virtual environments, including non-global zone A 140(a) and non-global zone B 140(b), referred to collectively herein as non-global zones 140. Non-global zones 140 are persistent environments because they may have a lifetime longer than any of the processes associated with them. Further, non-global zones 140 provide a virtualized environment because they are capable of supporting the isolated execution of processes, such as process A1 174-1(a) and process A2 174-2(a), executing in non-global zone A 140(a) and process B1 174-1(b) and process B2 174-2(b) executing within non-global zone B 140(b). Both of non-global zones 140(a) and 140(b) are able to exist under a single kernel 150. A process C 232 can execute within global zone 130 of operating system environment 100, as well. Visibility and access of objects to processes in the non-global zones 140 will differ from that of processes in the global zone 130.

Further with reference to FIG. 2A, the operation of communications management techniques in one embodiment are illustrated by non-global zone A 140(a), in which process A1 174-1(a) initiates an inter-process communications with a second process A2 174-2(a). In order to initiate communications, process A1 174-1(a) attempts to bind to communications object X 244(a) residing within non-global zone A 140(a) as indicated by a dashed line 113(a). Object X 244(a) enables processes to "rendezvous" in order to establish a communication path. In the representative example embodiment illustrated by FIG. 2A, process A2 174-2(a) has already bound to object X 244(a).

In some embodiments, isolation of inter-process communications to within non-global zone boundaries can be achieved using a key based namespace, a file system or combinations thereof. In one embodiment, data structures for managing the namespaces for each non-global zone may be allocated in the kernel 150. A communications object may be any of a transport endpoint, a pipe, a stream, a socket, a Portable Operating System Interface (POSIX) inter-process communications interface and a doors interface, in some embodiments using file system isolation techniques. Some embodiments employing key based namespace techniques can use any of a loopback transport provider, a semaphore, a shared memory segment, a message queue and an event channel. Some embodiments can use one or both types of isolation techniques, as well as, many other types of transport media, both existing and prospective.

Because process A1 174-1(a) is assigned to non-global zone A 140(a), process A1's visibility and access to communications objects facilitating inter-process communications can be isolated to those objects assigned to non-global zone A 140(a). Thus, process A1 174-1(a) is able to view and access communications object X 244(a), in non-global zone A 140(a), however, process A1 174-1(a) can be prohibited from viewing or accessing communications object X 244(b) in non-global zone B 140(b). Similarly, process B1 174-1(b), assigned to non-global zone B 140(b), can be isolated to establishing inter-process communications with other processes assigned to non-global zone B 140(b), such as process B2 174-2(b) using those communications objects assigned to non-global zone B 140(b), such as communications object X 244(b), for example. In some embodiments, the present invention provides the capability to create communication objects having the same name in each non-global zones 140. Accordingly, in one embodiment, a first process may create a first communications object, named object X, such as object X 244(a) in non-global zone 140(a) and a second process may create a second communications object, named object X, such as object X 244(b) in non-global zone 140(b) without interference. The capability to have objects with identical names in different non-global zones provided by some embodiments enables support for inter-process communications mechanisms that employ communications objects having standardized names in more than one non-global zone.

In one embodiment, process A1 and process B1 are isolated from establishing inter-process communications with one another using communications objects in each process' non-global zone without invoking assistance of an inter-zone communications process C 232 in global zone 130. In one embodiment, since process C 232 is assigned to global zone 130, process C 232 is able to view communications objects in the non-global zones, such as communications object X 244(a) and communications object X 244(b), as indicated by alternating dashed lines 119(a) and 119(b). In one embodiment, process C 232 is permitted to access communications object X 244(a) or communications object X 244(b) in order to establish inter-zone communications, provided that process C232 has appropriate privileges to do so.

A variety of mechanisms are available for providing inter-process communications capability in some embodiments. For purposes of discussion, and not as a limitation, inter-process communications techniques will be broadly categorized into two classifications based upon a type of isolation technique used, namespace based isolation techniques and file system based isolation techniques.

Key Based Namespace Isolation

Figure 2B:
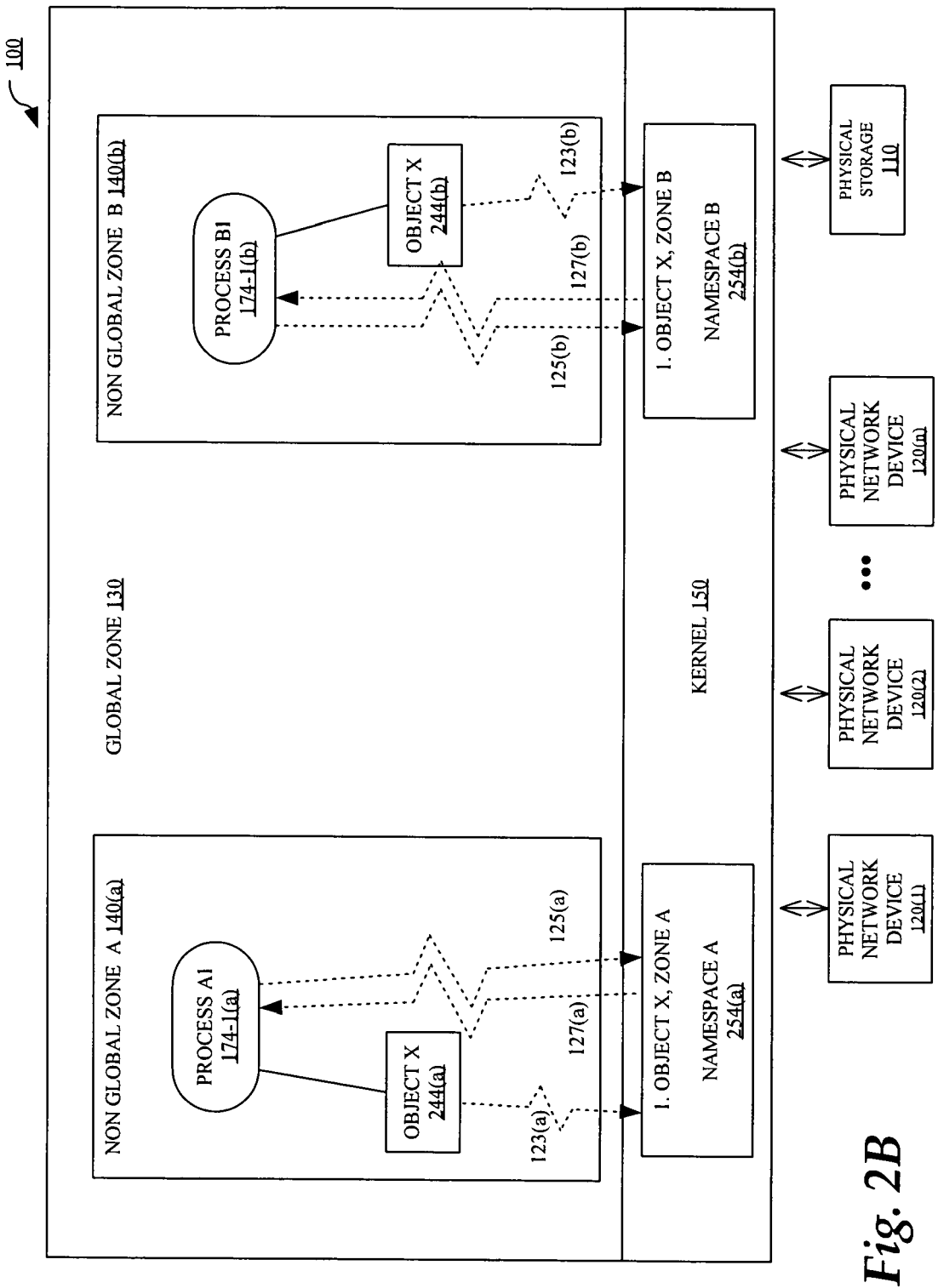
FIG. 2B is functional block diagram of a representative inter-process communications mechanism using a key based namespace in the operating system environment of FIG. 2A in an embodiment of the present invention.

FIG. 2B is functional block diagram of a representative inter-process communications mechanism using a key based namespace in the operating system environment of FIG. 2A in an embodiment of the present invention.

As shown by FIG. 2B, a kernel process maintains information about objects in the namespace of non-global zone A and non-global zone B in a structure 254(a) and structure 254(b), respectively. In one embodiment, structure 254(a) and structure 254(b) may be portions of a common structure. In the specific embodiment illustrated by FIG. 2B, however, structure 254(a) and structure 254(b) are distinct structures. The kernel process maintains information about objects in non-global zone A 140(a), including the communications object X 244(a) in structure 254(a) using a communication object identifier, which is "X" in the representative example of FIG. 2B, and a zone identifier or 'key', which is "A" in the illustrated example. Other mechanisms for identifying unique instances of objects in the various non-global zones may be used in other embodiments of the present invention as will be readily apparent to those skilled in the art.

A communication object X 244(a) is created by an initialization process (not shown in FIG. 2B) and its credentials, which in one embodiment comprise a communication object identifier and a zone identifier, are sent 123(a) to a kernel process. The kernel process stores the credential into the structure 254(a) for later use. When a process, such as process A1 174-1(a), initiates an inter-process communications, the initiating process makes a request 125(a) of the kernel process to establish an inter-process communication with another process using a particular transport medium. The kernel process determines whether a communications object corresponding to the transport medium, such as communications object X 244(a), is present in non-global zone A 140(a) and whether the key of process A1 A74-1(a) matches the key of communications object X

244(*a*). The kernel process can reference structure 254(*a*) to determine whether the requested object is present in the zone of the requesting process. If the kernel process locates information for the requested object in the structure 254(*a*), then the kernel process can make a response 127(*a*) in which the kernel process can return an address or other token related to communications object X 244(*a*) to requesting process A1 174-1(*a*).

A dotted line 123(*a*) indicates a request by an initialization process (not shown in FIG. 2B) to add communications object X 244(*a*) to structure 254(*a*) in order to enable processes in non-global zone 140(*a*) to access object A 244(*a*). A dotted line 125(*a*) illustrates a request by process A1 174-1(*a*) to establish inter-process communications using the transport medium of communications object X 244(*a*). Process A1 174-1(*a*) is seeking to initiate an inter-process communications path with another process (not shown in FIG. 2B) using a transport mechanism accessible by object X 244(*a*). A dotted line 127(*a*) indicates a response by a kernel process with the appropriate token to process A1 174-1(*a*).

In some embodiments, the key-based namespace mechanism can be used with a variety of transport mechanisms to provide inter-process communications for processes within the non-global zones. Examples of select transport mechanisms used in some embodiments to isolate inter-process communications within non-global zone boundaries using key based namespaces include, loopback transport providers, System V inter-process communications providers and event channels, each of which will now be described in further detail with reference to example embodiments.

Loopback Transport Providers

The loopback transport providers, ticlts, ticots and ticotsord, provide key-based namespace transport mechanism for inter-process communications. These transport mechanisms can be accessed using standard transport-independent TLI/XTI interfaces. The loopback transports are used for communication between processes on the same machine. In one embodiment, loopback transport providers may be implemented as pseudo devices without involving the kernel resident networking stack. In one embodiment, the transport mechanisms support so called "flex addresses," which can comprise arbitrary sequences of octets of length greater than 0.

In one embodiment using zones, the flex address space can be partitioned to isolate communication between processes within the zone. In one embodiment, each zone can have a distinct flex address namespace. In one embodiment, this may be achieved by associating zone ids with transport endpoints based on the zone id of the process performing the bind (3SOCKET) call. A process invoking a connect process (3SOCKET) will connect to an endpoint with a matching address associated with the caller's zone. Some embodiments can enable multiple processes to bind to the same address as long as the processes are in different non-global zones. Accordingly, multiple applications can use the same address without conflict if the applications are running in different non-global zones. Some embodiments using these techniques can avoid the need for cross-zone coordination in address selection.

System V Inter-process Communications

The System V inter-process communications interfaces enable applications to create persistent objects, such as shared memory segments, semaphores and message queues, for example, for communications and synchronization between processes resident on the same system. In one embodiment, these communications objects comprise dynamically assigned numeric identifiers that can be associated with user-defined keys enabling usage of a single object in unrelated processes. In one embodiment, objects may be associated with an owner. In one embodiment, the association of an object with an owner may be based on an effective user id of the creating process unless explicitly changed. In one embodiment, permission flags can be set to restrict access to these objects.

In order to prevent sharing (intentional or unintentional) between processes in different non-global zones, in one embodiment, a zone id is associated with each communications object based on the non-global zone in which the process that created the communications object was running at time of creation. Processes running in a non-global zone may be permitted to access or control communications objects associated with the same zone. Processes running in the global zone may be permitted to access and control communication objects associated with the global zone and with the non-global zones (subject to any user id based restrictions) to enable a global administrator to manage inter-process communications objects throughout the system from the global zone. In one embodiment, a different key namespace may be provided for each non-global zone can order to avoid the possibility of conflicts between the non-global zones.

In one embodiment, administrative commands used with inter-process communications mechanisms, such as ipcs (1) and ipcrm (1), have zone specific options for use when run in the global zone. By default, ipcs will report objects from the current zone. When run in the global zone, however, the -z zone option can be used to cause the command to report objects from the specified zone. The -Z option can be used to cause the command to report objects from all zones, with the zone association of each identified. In some embodiments, the new zone specific options, when used with these administrative commands, can be used to disambiguate between objects having identical communication object identifiers in different zones. In some embodiments, better observability into the usage of inter-process communications objects within zones may be provided.

The ipcrm command similarly operates on objects in the current zone unless run in the global zone and given the -z zone option. This option allows removal of objects in other zones.

In one embodiment, zone specific resource controls that prevent, or in some embodiments enable administrators to avoid, kernel memory exhaustion by one zone. Zone specific resource controls can enable some embodiments to use System V inter-process communications mechanisms substantially free of static system-wide limits on the number of objects that can be created.

Event Channels

Event Channels provide another inter-process communications mechanism that may be used with an operating system environment that has been partitioned into a global zone and one or more non-global zones in one embodiment. Event channels provide an inter-process communications mechanism in which inter-process rendezvous is established through use of a communications object identifier (a string representing the channel name) provided by participating processes. In one embodiment, providing each non-global zone with a separate key based namespace can isolate inter-process communications using event channels within non-global zone boundaries.

In one embodiment, a mechanism for controlling the number of event channels created in each non-global zone may be provided. In one embodiment, certain event channels may be enabled to cross non-global zone boundaries. In one embodiment, certain types of events can be communicated from either the kernel or the global zone to non-global zones using an event channel. In one embodiment, the ability to communicate between non-global zones using event channels will be restricted to the specific channels used to communicate fault and error events. In one embodiment, the ability to communicate between non-global zones may be controlled using a private API. In one embodiment, the use of and access to event channels will be restricted to processes in the global zone.

Filesystem Based Isolation

In some embodiments, certain inter-process communications mechanisms use the file system as a rendezvous point for establishing communications between two or more processes. These mechanisms can include, for example, pipes, streams and sockets interfaces.

Figure 2C:
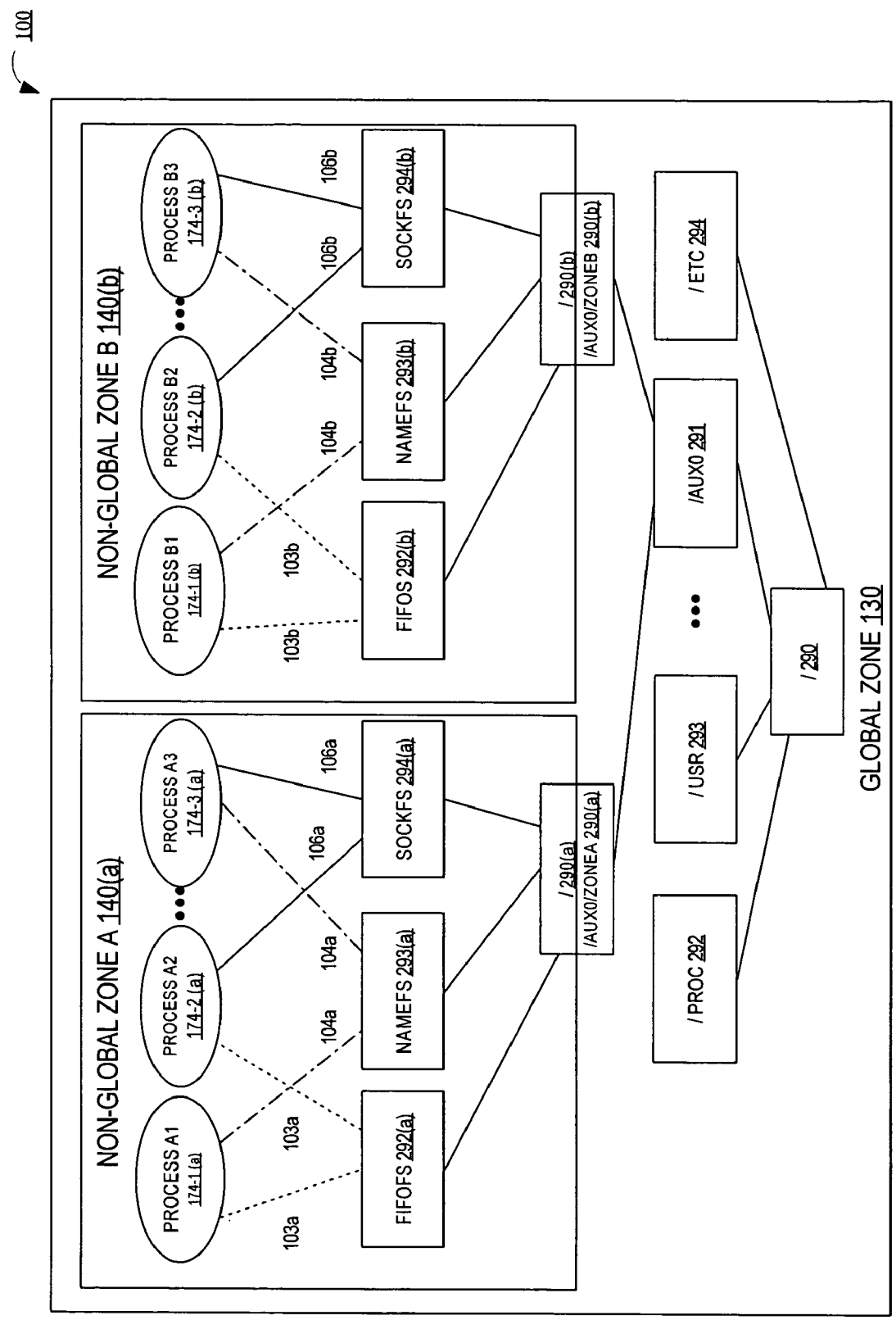
FIG. 2C is functional block diagram of a representative inter-process communications mechanism using a file system in the operating system environment of FIG. 2A in an embodiment of the present invention.

FIG. 2C is functional block diagram of a representative file system locations for the operating system environment of FIG. 2A in one embodiment of the present invention. As shown in FIG. 2C, file system 180 of FIG. 1 comprises a number of directories arranged in a hierarchical tree like structure. For example, in non-global zone A 140(a), file system 180(a) is mounted at a zone root directory 290(a). In operating system nomenclature, the root directory is signified by a slash ("/"). Because root directory 290(a) is a zone root directory, it will appear to processes within the non-global zone A 140(a) to be the root directory. Directory 290(a) is a subdirectory of an/AUX0 directory 291, which is part of the file system 180 accessible by processes in the global zone 130. From the point of view of a process in the global zone 130, the directory 290(a) is directory/AUX0/zone A 290(a).

In one embodiment, the zone's root directory is distinct from the directory set by chroot, a system command for establishing a root directory, for the processes within the zone. In one embodiment, both restrictions are checked when a process is traversing pathname components. This enables chroot to be used within a zone, but if a process escapes from its chroot restriction, that process will still be unable to escape the zone restriction.

Zone root directory 290(a) comprises one or more subdirectories, which in one embodiment may include file system locations that serve as rendezvous points for inter-process communications, such as streams file system location fifos 292(a), a pipes and doors file system location namefs 293(a), and a sockets file system location, sockfs 294(a). This is not an exhaustive list and other file system locations may also be included in other subdirectories of the root directory 290(a) in some embodiments. A number of processes running in non-global zone A 140 (a), such as a process A1 174-1(a) and process A2 174-2(a) have established an inter-process communications path 103(a). In one embodiment, the communications path 103(a) may be using a pipes transport medium that is using fifofs 292(a) as a rendezvous point. Process A2 174-2(a) and process A3 174-3(a) have also established an inter-process communications path 106(a) that uses sockfs 293(a) as a rendezvous point. Communications path 106(a) may be using a sockets type transport medium. FIG. 2C further illustrates that process A1 174-1(a) and process A3 174-3(a) also have established a communications path 104(a) using namefs 293(a), which may be using a streams or a doors transport medium.

Referring now to non-global zone B 140(b) of FIG. 2C, a separate instance of a file system 180(b) is mounted at root directory 290(b). Root directory 290(b) also comprises one or more subdirectories storing data and/or files of processes such as process B1 174-1(b), process B2 174-2(b) and process B3 174-3(b). FIG. 2C illustrates a plurality of file system locations, including fifofs 292(b), namefs 293(b) and sockfs 294(b) having the same communications object identifier as the file system locations used as rendezvous points in non-global zone 140(a), as described above. Because processes B1 174-1(b), B2 174-2(b), and B3 174-3(b) are contained in non-global zone B 140(b), these processes are permitted to bind to the file system locations for fifofs 292(b) namefs 293(b) and sockfs 294(b) of non-global zone 140 (b) without interference with the communications objects having the same identifiers in non-global zone 140(a). In the example embodiment of FIG. 2C, the directories and associated structure of the file system 180(b) of non-global zone B 140(b) are closely analogous to the portions of file system 180(a) of non-global zone A 140(a), however, this is not necessarily always the case, and implementation specific alternatives will exist. For example, in some embodiments, file system 180(a) and file system 180(b) may be mapped to a single physical storage in what is known as a loop back file system in one embodiment.

Global zone 130 includes a file system root directory 290 of the operating system environment 100. The file system of global zone 130 also includes one or more subdirectories, such as for example as /PROC 292, /USR 293, and /ETC 294. In one embodiment, root directory /290 includes a sub-directory /AUX0 291, which has as its subdirectories directory /AUX0/zone A 290(a) and directory /AUX0/zone B 290(b) to implement the zone root directories /290(a) and /290(b).

In some embodiments, the file system location mechanism can be used with a variety of transport mechanisms to provide inter-process communications for processes within the non-global zones. Examples of select transport mechanisms used in some embodiments to provide inter-process communications using the file system location as a rendezvous point include pipes, streams, and sockets, and doors inter-process communications, each of which will now be described in further detail with reference to example embodiments.

Pipes, Streams, and Sockets

Pipes, streams and UNIX domain sockets provide examples of inter-process communications mechanisms that may be managed using file system locations as a rendezvous point. In one embodiment, processes communicating with pipes rendezvous via fifofs, processes communicating with streams rendezvous via namefs and processes using UNIX domain sockets rendezvous via sockfs. Since processes in one non-global zone will not have access to file system locations associated with other non-global zones, processes residing in the non-global zones using these inter-process communications mechanisms may be confined to the boundaries of the non-global zone in which they reside. In one embodiment, the file system hierarchy may be used to isolate inter-process communications within non-global zone boundaries because the file system hierarchy is partitioned, effectively blocking processes from establishing an inter-process communications without the involvement of the global zone (which has access to the entire file system hierarchy). For example, in one embodiment, if processes in different non-global zones are to be permitted to communicate with one another, an interface can be provided for each process to determine the credentials (including zone id) of processes on the other end of the connection.

Doors

Doors is an inter-process communications mechanism that uses the file system as a rendezvous (via namefs). Client processes using doors as a communications transport medium will normally be able to call servers within the same zone. In one embodiment, cross-zone communications using doors as being communications transport mechanism may be provided, since the doors server can retrieve the credentials of the caller using the credentials retrieval process called door_ucred (3DOOR). In one embodiment, the private data structure returned by door_ucred is extended in order to include a zone id and to add an ucred-get zone id (3C) interface for retrieving the zone id information from the structure. In some embodiments, this can enable the creation of global doors servers, in which a door served from the global zone can be mounted in each non-global zone, and the server can check whether the caller is authorized to perform a given operation based on its zone id as well as other credential information. In some embodiments, this can provide a mechanism for cross-zone communication using doors as a communications transport mechanism.

Sample Operation

A sample operation of the operating system 100 in accordance with one embodiment of the present invention will now be described. In the following discussion, reference will be made to the system diagram of FIGS. 2A-2C and the flow diagrams of FIGS. 3A-3I.

Figure 3A:
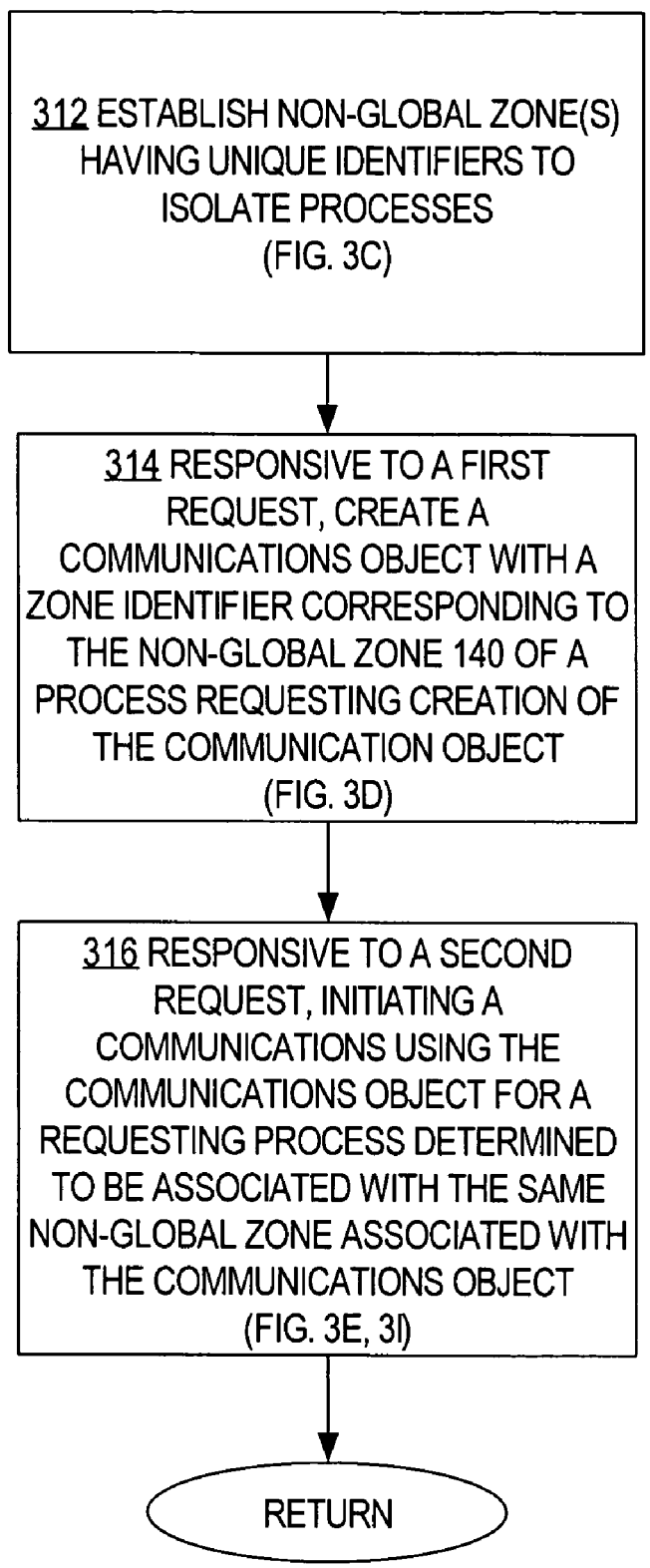
FIGS. 3A-3I are operational flow diagrams illustrating the operation of one embodiment of the present invention.

FIG. 3A is an operational flow diagram illustrating the operation of one embodiment of the present invention. In the embodiment discussed with reference to FIG. 3A, in block 312, non-global zones having unique identifiers are established to isolate processes as described in further detail in FIG. 3C. In block 314, responsive to a first request, a communications object is created. The communications object comprises a zone identifier corresponding to the non-global zone 140 associated with a process making the request to create the communication object, as described in further detail with reference to FIG. 3D. In block 316, responsive to a request, communications using the communications object are initiated for a requesting process that has been determined to be associated with the same non-global zone associated with the communications object, as described in further detail with reference to FIGS. 3E and 3I.

Figure 3B:
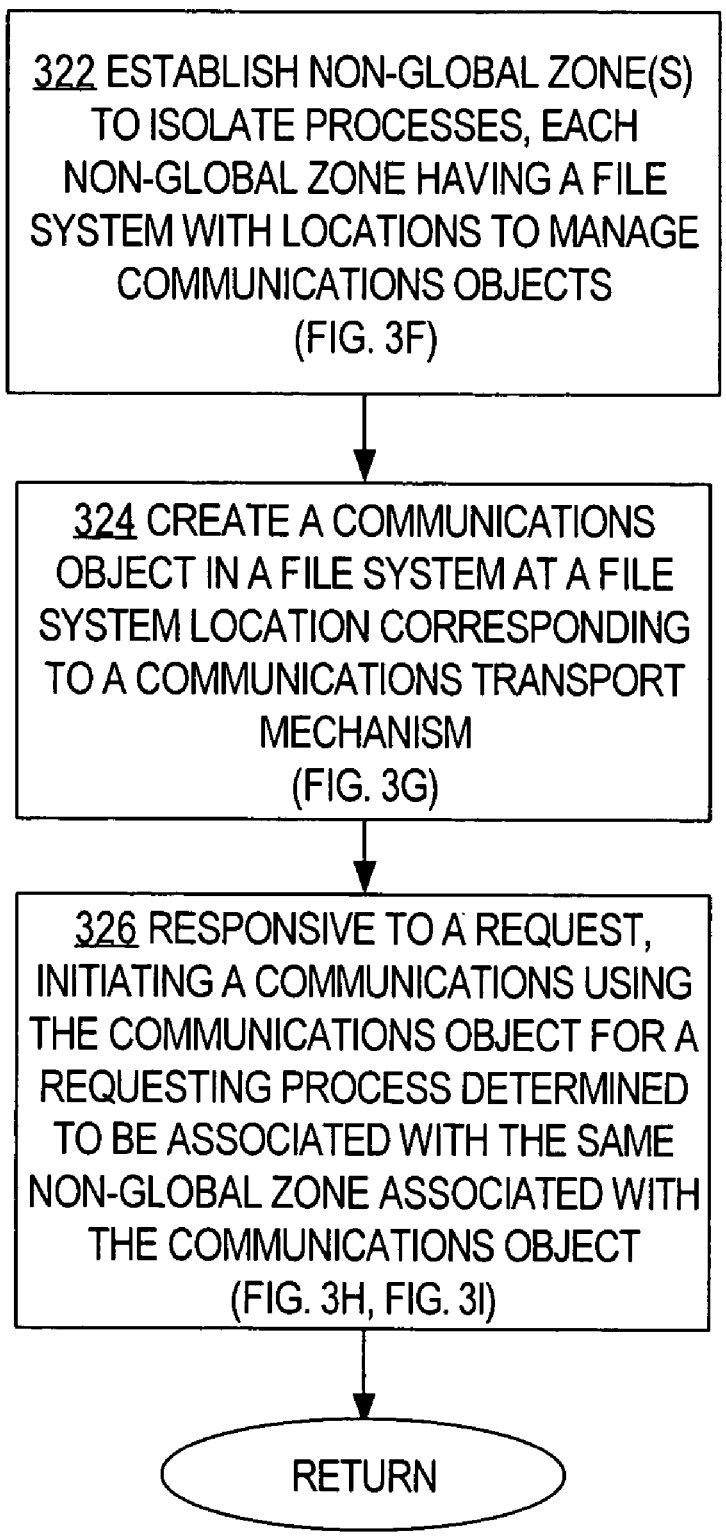

FIG. 3B is an operational flow diagram illustrating the operation of one embodiment of the present invention. In the embodiment discussed with reference to FIG. 3B, in block 322, non-global zones 140 are established to isolate processes. Each non-global zone 140 has a file system having a file system with locations to manage communications objects is provided as described in further detail with reference to FIG. 3F. In block 324, communications object 244 is created in a file system location of the file system associated with non-global zone 140. The file system location corresponds to a communications transport mechanism as described in further detail with reference to FIG. 3G. In block 326, responsive to a request, communications using the communications object are initiated for a requesting process that has been determined to be associated with the same non-global zone associated with the communications object, as described in further detail with reference to FIGS. 3H and 3I.

Figure 3C:
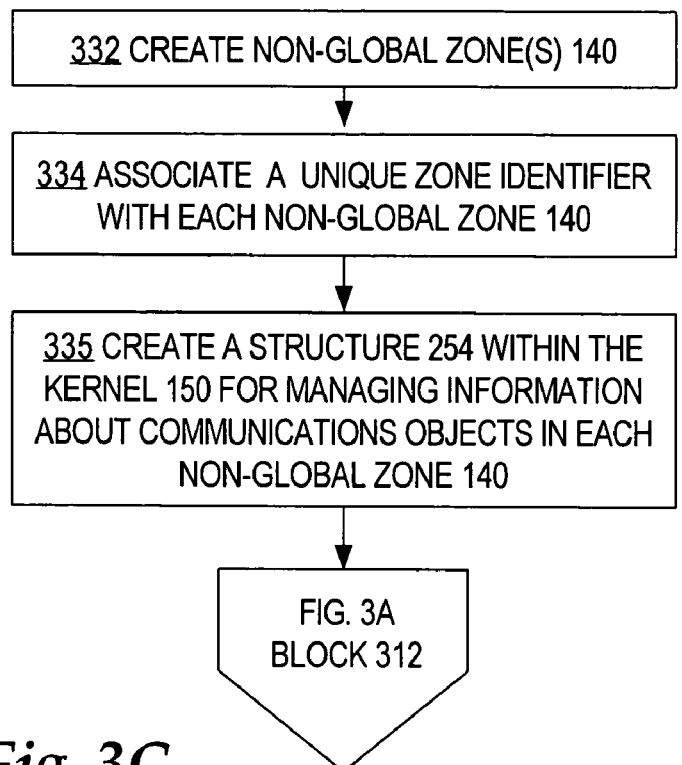

Referring to FIG. 3C, which is an operational flow diagram illustrating the operation of block 312 of FIG. 3A in one embodiment of the present invention, in block 332, the non-global zone(s) 140 are created. In block 334, a unique zone identifier associated with each non-global zone 140. In block 335, structure 254 is created in the kernel 150 to manage information about communications objects in the non-global zone 140.

Figure 3D:
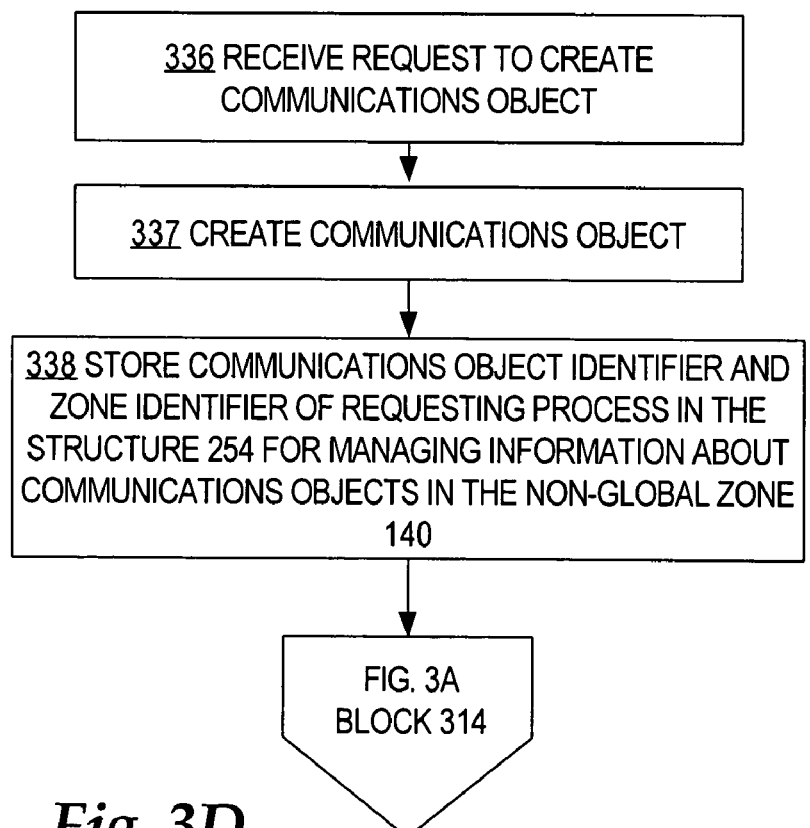

Referring to FIG. 3D, which is an operational flow diagram illustrating the operation of block 314 of FIG. 3A in one embodiment of the present invention, in block 336 a request to create a communications object is received. In block 337, the communications object is created. In block 338, a communications object identifier and a unique zone identifier of the requesting process are stored in the structure 254 for managing information about communications objects in the non-global zone 140. In one embodiment, the communications object identifier and a unique zone identifier comprise credentials associated with a communications object.

Figure 3E:
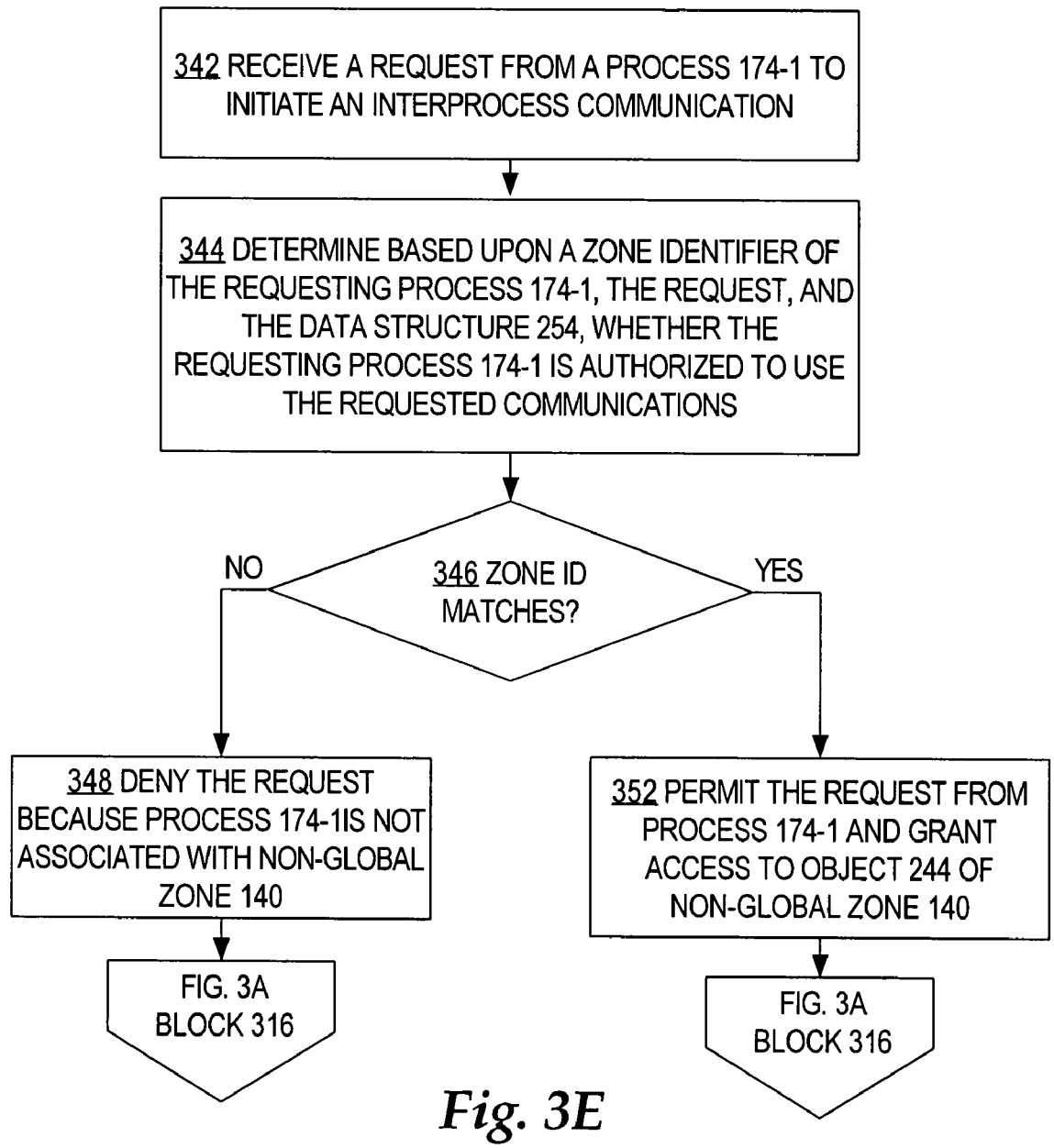

Referring to FIG. 3E, which is an operational flow diagram illustrating the operation of block 316 of FIG. 3A in one embodiment of the present invention, in block 342 a request to initiate an inter-process communications is received from process 174-1. In block 344, a determination is made based upon a zone identifier of the requesting process 174-1, the request, and the data structure 254, whether the requesting process 174-1 is authorized to use the requested communications. In block 346, a test is performed to see if the zone identifier (or key) of the requesting process 174-1 matches the zone identifier (or key) of the communications object 244 corresponding to the request. If the zone IDs do not match, then in block 348, the request from process 174-1 associated with non-global zone 140 to access an object 244 is denied. Otherwise, if the zone IDs do match, then in block 352 the request from process 174-1 associated with non-global zone 140 is permitted and access to communications object 244 is granted.

Figure 3F:
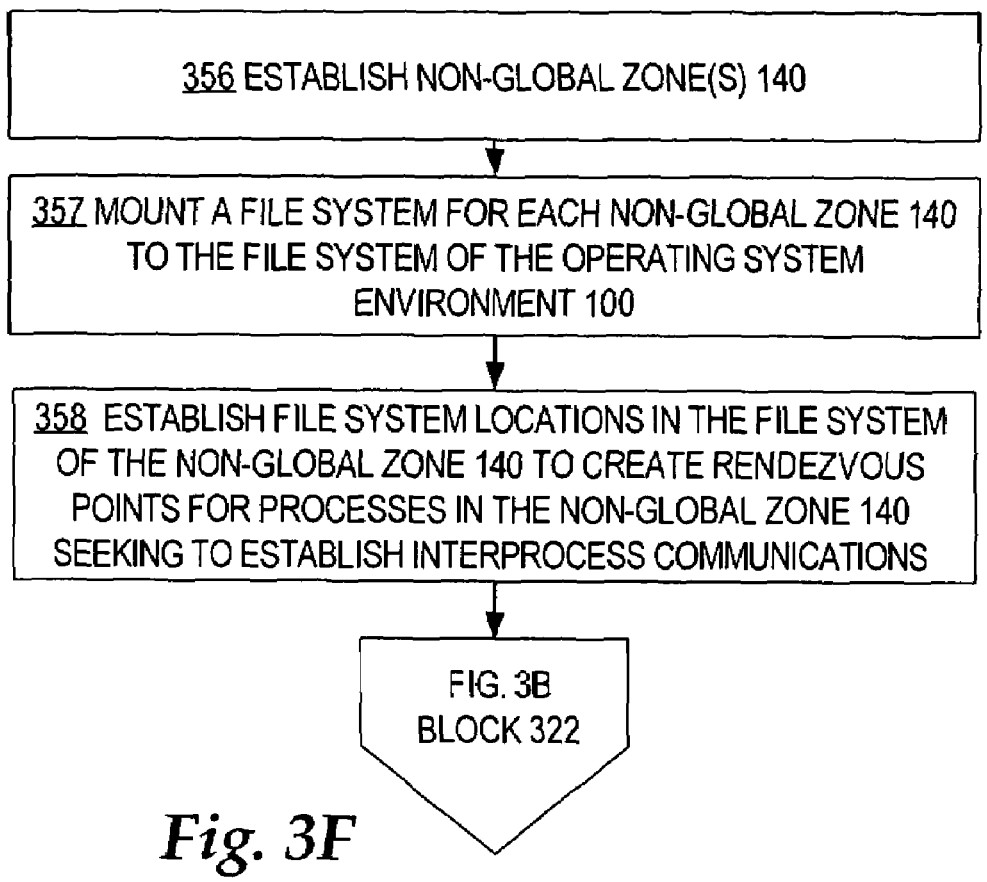

Referring to FIG. 3F, which is an operational flow diagram illustrating the operation of block 322 of FIG. 3B in one embodiment of the present invention, in block 356, non-global zone(s) 140 are established. In block 357, a file system is mounted for each non-global zone 140 to the file system of the operating system environment 100. In block 358, file system locations in the file system of the non-global zone 140 are established in order to create rendezvous point(s) for the processes in the non-global zone 140 seeking to establish inter-process communications.

Figure 3G:
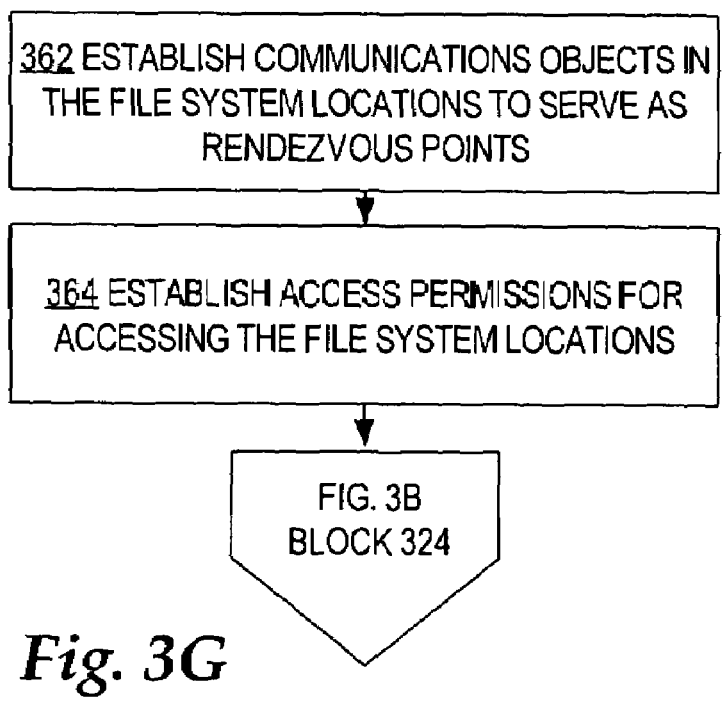

Referring to FIG. 3G, which is an operational flow diagram illustrating the operation of block 324 of FIG. 3B in one embodiment of the present invention, in block 362, communications objects are established in the file system locations to serve as rendezvous points for processes seeking to establish inter-process communications. In block 364, access permissions for the file system locations are established. In one embodiment, processes 174-1 seeking to access inter-process communications within the non-global zone 140 comply with these permissions.

Figure 3H:
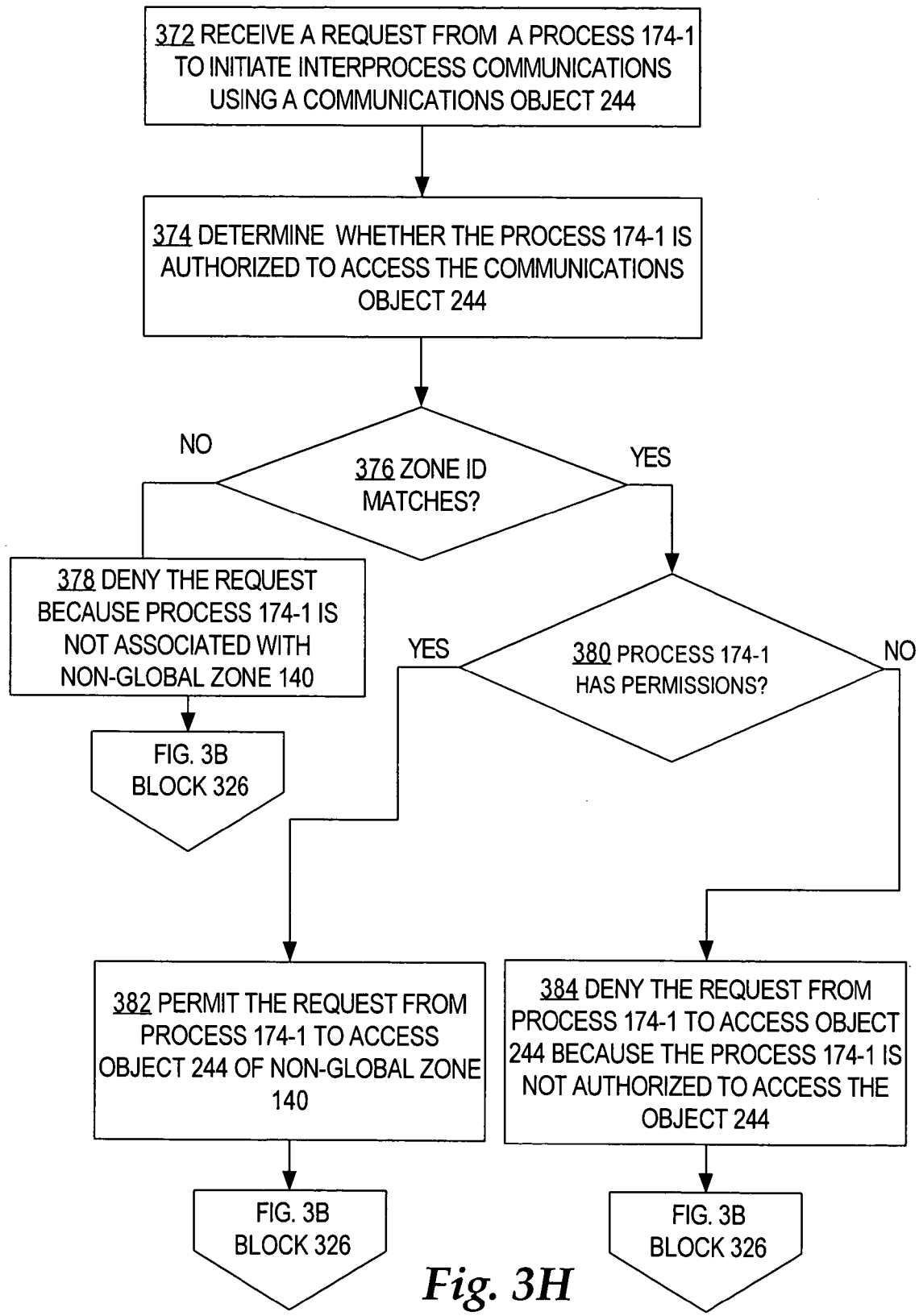
Figure 3I:
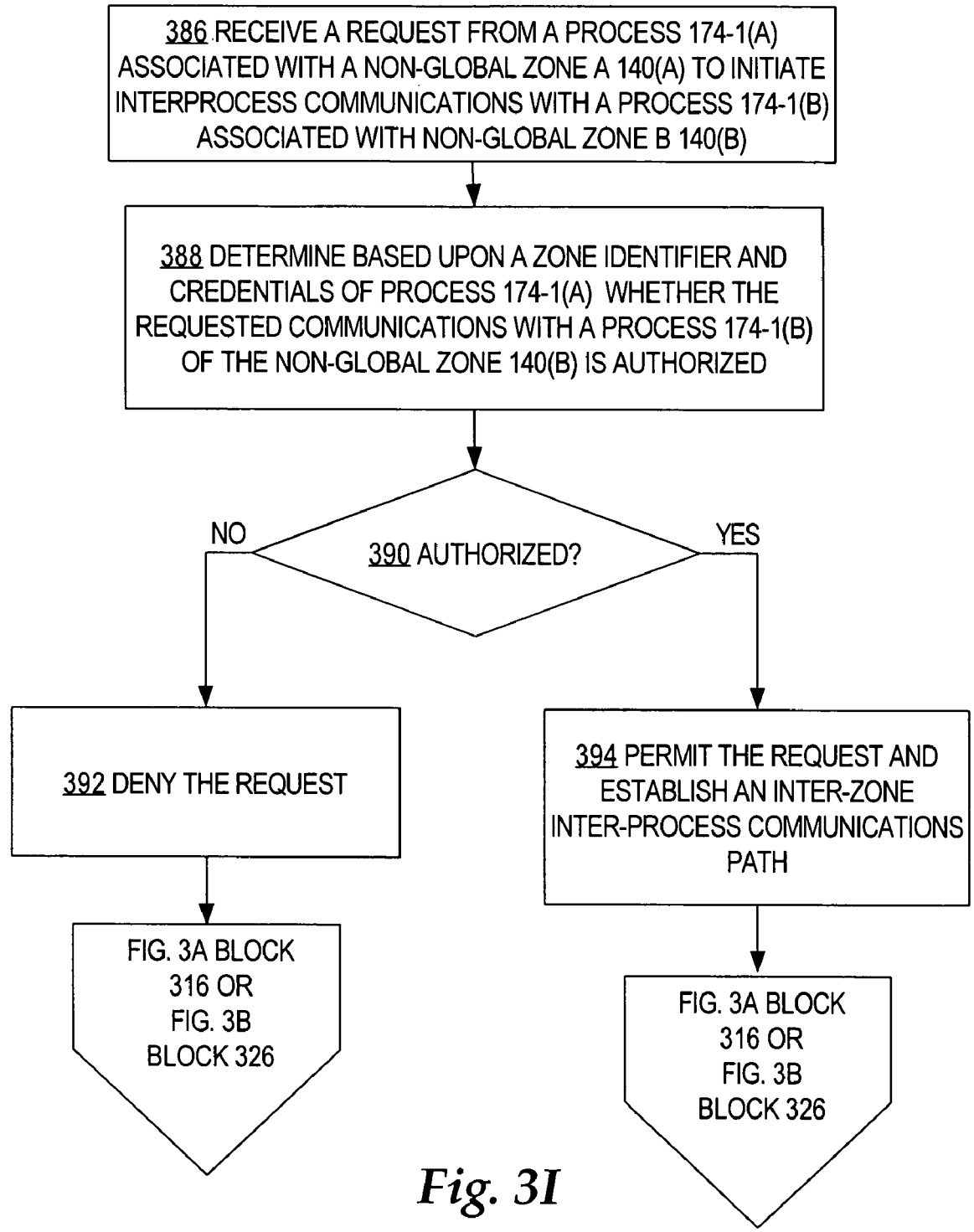

Referring to FIG. 3H, which is an operational flow diagram illustrating the operation of block 326 of FIG. 3B in one embodiment of the present invention, in block 372 a request from a process 174-1 to initiate an inter-process communications using a communications object 244 is received. In block 374, a determination is made whether the process 174-1 is authorized to access the communications object 244. In block 376, a test is performed to see if the zone identifier of the requesting process 174-1 matches the zone identifier of the communications object 244. If the zone identifiers do not match, then in block 378, the request from process 174-1 is denied. Otherwise, if the zone identifiers do match, then in block 380 a test is performed to see if the requesting process 174-1 has appropriate access permissions for the file system locations containing the communications object 244. If the requesting process has the appropriate access permissions, then in block 382 the request from process 174-1 to access object 244 is permitted. Otherwise if the requesting process 174-1 does not have appropriate access permissions, then in block 384, the request from the process 174-1 is denied.

Referring to FIG. 31, which is an operational flow diagram illustrating the operation of block 316 of FIG. 3A and block 326 of FIG. 3B in one embodiment of the present invention, in block 386 a request from a process 174-1(a) associated with non-global zone 140(a) to initiate an inter-process communication with a process 174-1(b) associated with non-global zone B 140(b) is received. In block 388, a determination is made based upon the zone identifier and credentials of process 174-1(a), whether the requested communications with a process 174-1(b) in a non-global zone B 140(b) is authorized. In block 390, a test is performed to see if the requesting process 174-1(a) is authorized to commence inter-process communications with a process in another non-global zone. If the requesting process 174-1(a) is authorized, then in block 394 the request from process 174-1(a) associated with non-global zone 140(a) is permitted and an inter-zone inter-process communications path is established. Otherwise if the requesting process 174-1(a) is not authorized, then in block 392, the request from the process 174-1(a) is denied.

Hardware Overview

Figure 4:
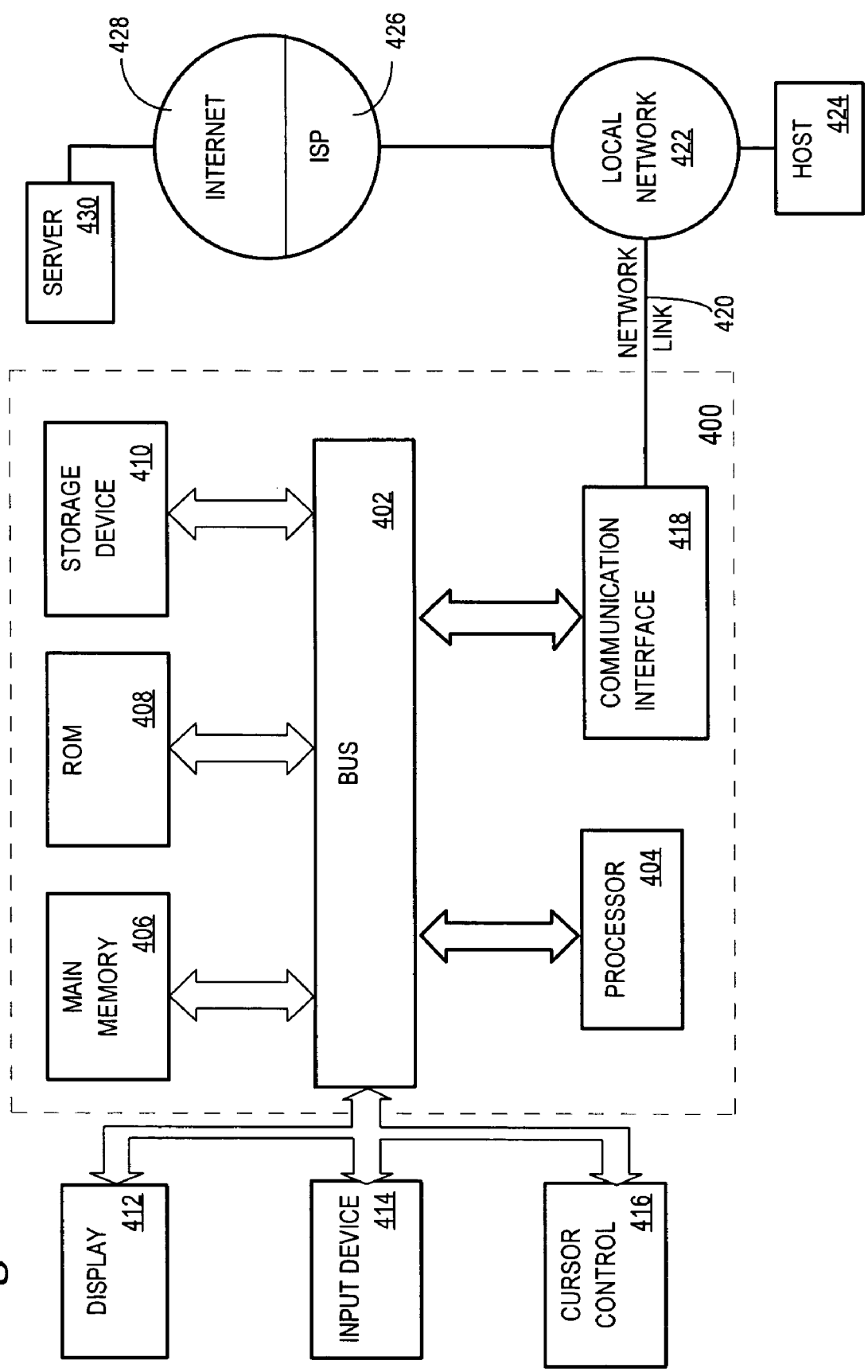
FIG. 4 is a hardware block diagram of a representative computer system, which may be used to embody one or more components of an embodiment of the present invention.

FIG. 4 is a block diagram that illustrates a computer system 400 upon which an embodiment of the invention may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may also be a medium (e.g. air) that enables signals to be capacitively exchanged between one or more of the components. Bus 402 may further be a network connection that connects one or more of the components. Overall, any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. In this instance, the bus 402 would be the medium (such as air) that enables this capacitive communication to take place. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, it should be noted that although the invention has been described with reference to one embodiment, it should not be construed to be so limited. Various modifications may be made by those of ordinary skill in the art with the benefit of this disclosure without departing from the spirit of the invention. Thus, the invention should not be limited by the embodiments used to illustrate it but only by the scope of the issued claims. The specification and drawings are, accordingly, to be regarded as illustrative rather than limiting.

What is claimed is:

1. A method comprising:

in a global operating system environment controlled by a single operating system kernel instance, establishing a first non-global zone and a second non-global zone, wherein the first non-global zone has a unique first zone identifier and the second non-global zone has a unique second zone identifier;

receiving from a first process executing in association with the first non-global zone a request to create a first inter-process communications (IPC) object, wherein the first process provides a particular object identifier to be assigned to the first IPC object, and wherein the first process has the first zone identifier associated therewith;

creating a first IPC object, wherein the first zone identifier associated with the first process is associated with the particular object identifier to give rise to a first augmented identifier for the first IPC object;

receiving from a second process executing in association with the first non-global zone a request to initiate inter-process communication using a transport mechanism accessible by the first IPC object, wherein the second process has the first zone identifier associated therewith;

determining, based at least partially upon the transport mechanism requested by the second process and the first zone identifier associated with the second process, that the second process is requesting access to the first IPC object;

permitting the second process to access the first IPC object to communicate with the first process;

receiving from a third process executing in association with the second non-global zone a request to create a second IPC object, wherein the third process provides the same particular object identifier to be assigned to the second IPC object, and wherein the third process has the second zone identifier associated therewith;

creating a second IPC object, wherein the second zone identifier associated with the third process is associated with the particular object identifier to give rise to a second augmented identifier for the second IPC object;

receiving from a fourth process executing in association with the second non-global zone a request to initiate inter-process communication using a transport mechanism accessible by the second IPC object, wherein the fourth process has the second zone identifier associated therewith;

determining, based at least partially upon the transport mechanism requested by the fourth process and the second zone identifier associated with the fourth process, that the fourth process is requesting access to the second IPC object; and permitting the fourth process to access the second IPC object to communicate with the third process;

thereby enabling processes in the first non-global zone and the second non-global zone to use the same particular object identifier for inter-process communication without collision.

2. The method of claim 1, wherein the particular object identifier comprises at least one of an address, a socket identifier, a port, a flex address, a semaphore identifier, a message queue identifier, a shared memory segment identifier, a pipe and a stream identifier.

3. The method of claim 1, wherein establishing the first non-global zone comprises:
 creating the first non-global zone;
 associating the first zone identifier with the first non-global zone; and
 creating a data structure for managing information pertaining to IPC objects associated with the first non-global zone.

4. The method of claim 1, wherein the first IPC object comprises at least one of a loopback transport provider, a semaphore, a shared memory segment, a message queue and an event channel.

5. A computer readable storage medium, comprising:
 instructions for causing one or more processors to establish, in a global operating system environment controlled by a single operating system kernel instance, a first non-global zone and a second non-global zone, wherein the first non-global zone has a unique first zone identifier and the second non-global zone has a unique second zone identifier;
 instructions for causing one or more processors to receive from a first process executing in association with the first non-global zone a request to create a first inter-process communications (IPC) object, wherein the first process provides a particular object identifier to be assigned to the first IPC object, and wherein the first process has the first zone identifier associated therewith;
 instructions for causing one or more processors to create a first IPC object, wherein the first zone identifier associated with the first process is associated with the particular object identifier to give rise to a first augmented identifier for the first IPC object;
 instructions for causing one or more processors to receive from a second process executing in association with the first non-global zone a request to initiate inter-process communication using a transport mechanism accessible by the first IPC object, wherein the second process has the first zone identifier associated therewith;
 instructions for causing one or more processors to determine, based at least partially upon the transport mechanism requested by the second process and the first zone identifier associated with the second process, that the second process is requesting access to the first IPC object;
 instructions for causing one or more processors to permit the second process to access the first IPC object to communicate with the first process;
 instructions for causing one or more processors to receive from a third process executing in association with the second non-global zone a request to create a second IPC object, wherein the third process provides the same particular object identifier to be assigned to the second IPC object, and wherein the third process has the second zone identifier associated therewith;
 instructions for causing one or more processors to create a second IPC object, wherein the second zone identifier associated with the third process is associated with the particular object identifier to give rise to a second augmented identifier for the second IPC object;
 instructions for causing one or more processors to receive from a fourth process executing in association with the second non-global zone a request to initiate inter-process communication using a transport mechanism accessible by the second IPC object, wherein the fourth process has the second zone identifier associated therewith;
 instructions for causing one or more processors to determine, based at least partially upon the transport mechanism requested by the fourth process and the second zone identifier associated with the fourth process, that the fourth process is requesting access to the second IPC object; and
 instructions for causing one or more processors to permit the fourth process to access the second IPC object to communicate with the third process;
 thereby enabling processes in the first non-global zone and the second non-global zone to use the same particular object identifier for inter-process communication without collision.

6. The computer readable storage medium of claim 5, wherein the particular object identifier comprises at least one of an address, a socket identifier, a port, a flex address, a semaphore identifier, a message queue identifier, a shared memory segment identifier, a pipe and a stream identifier.

7. The computer readable storage medium of claim 5, wherein the instructions for causing one or more processors to establish the first non-global zone comprises:
 instructions for causing one or more processors to create the first non-global zone;
 instructions for causing one or more processors to associate the first zone identifier with the first non-global zone; and
 instructions for causing one or more processors to create a data structure for managing information pertaining to IPC objects associated with the first non-global zone.

8. The computer readable storage medium of claim 5, wherein the first IPC object comprises at least one of a loopback transport provider, a semaphore, a shared memory segment, a message queue and an event channel.

9. An apparatus, comprising:
 means for establishing, in a global operating system environment controlled by a single operating system kernel instance, a first non-global zone and a second non-global zone, wherein the first non-global zone has a unique first zone identifier and the second non-global zone has a unique second zone identifier;
 means for receiving from a first process executing in association with the first non-global zone a request to create a first inter-process communications (IPC) object, wherein the first process provides a particular object identifier to be assigned to the first IPC object, and wherein the first process has the first zone identifier associated therewith;
 means for creating a first IPC object, wherein the first zone identifier associated with the first process is associated with the particular object identifier to give rise to a first augmented identifier for the first IPC object;
 means for receiving from a second process executing in association with the first non-global zone a request to initiate inter-process communication using a transport mechanism accessible by the first IPC object, wherein the second process has the first zone identifier associated therewith;
 means for determining, based at least partially upon the transport mechanism requested by the second process and the first zone identifier associated with the second process, that the second process is requesting access to the first IPC object;

means for permitting the second process to access the first IPC object to communicate with the first process;

means for receiving from a third process executing in association with the second non-global zone a request to create a second IPC object, wherein the third process provides the same particular object identifier to be assigned to the second IPC object, and wherein the third process has the second zone identifier associated therewith;

means for creating a second IPC object, wherein the second zone identifier associated with the third process is associated with the particular object identifier to give rise to a second augmented identifier for the second IPC object;

means for receiving from a fourth process executing in association with the second non-global zone a request to initiate inter-process communication using a transport mechanism accessible by the second IPC object, wherein the fourth process has the second zone identifier associated therewith;

means for determining, based at least partially upon the transport mechanism requested by the fourth process and the second zone identifier associated with the fourth process, that the fourth process is requesting access to the second IPC object; and means for permitting the fourth process to access the second IPC object to communicate with the third process;

thereby enabling processes in the first non-global zone and the second non-global zone to use the same particular object identifier for inter-process communication without collision.

* * * * *